United States Patent
Kaku et al.

(10) Patent No.: US 6,985,539 B2
(45) Date of Patent: Jan. 10, 2006

(54) PEAK SUPPRESSION METHOD AND DATA TRANSMISSION APPARATUS

(75) Inventors: Takashi Kaku, Kawasaki (JP); Kyoko Hirao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 740 days.

(21) Appl. No.: 10/012,126

(22) Filed: Oct. 22, 2001

(65) Prior Publication Data

US 2002/0196863 A1  Dec. 26, 2002

(30) Foreign Application Priority Data

Jun. 20, 2001  (JP)  ............... 2001-186273

(51) Int. Cl.
*H04L 25/03* (2006.01)
*H03C 3/02* (2006.01)

(52) U.S. Cl. .................................. 375/297; 332/123
(58) Field of Classification Search ............... 375/285, 375/316, 295, 296, 219, 222, 346, 297; 379/93.01; 332/123, 117
See application file for complete search history.

(56) References Cited

U.S. PATENT DOCUMENTS 6,504,862 B1 * 1/2003 Yang ........................ 375/146

FOREIGN PATENT DOCUMENTS

EP      1 091 516      4/2001
WO   WO 99/55025      10/1999

OTHER PUBLICATIONS

European Search Report dated Jul. 28, 2005.
Stefan H. Miller, et al. A Comparison of Peak Power Reduction Schemes for OFDM. Global Telecommunications Conference, Nov. 3, 1997.
S. Narahashi, et al. Minimising Peak-to-Average Power Ratio of Multitone Signals using Steppest Descent Method. Electronics Letters, IEE Stevenage, GB, vol. 31, No. 18, Aug. 31, 1995.

* cited by examiner

*Primary Examiner*—Tesfaldet Bocure
(74) *Attorney, Agent, or Firm*—Katten Muchin Rosenman LLP

(57) ABSTRACT

A peak suppression method detects a peak value exceeding a threshold value of a transmitting signal, forms a peak value prediction signal which is limited to a noise cancelling frequency band of a receiving end, based on the detected peak value of the transmitting signal, and subtracts the peak value prediction signal from the transmitting signal.

28 Claims, 20 Drawing Sheets

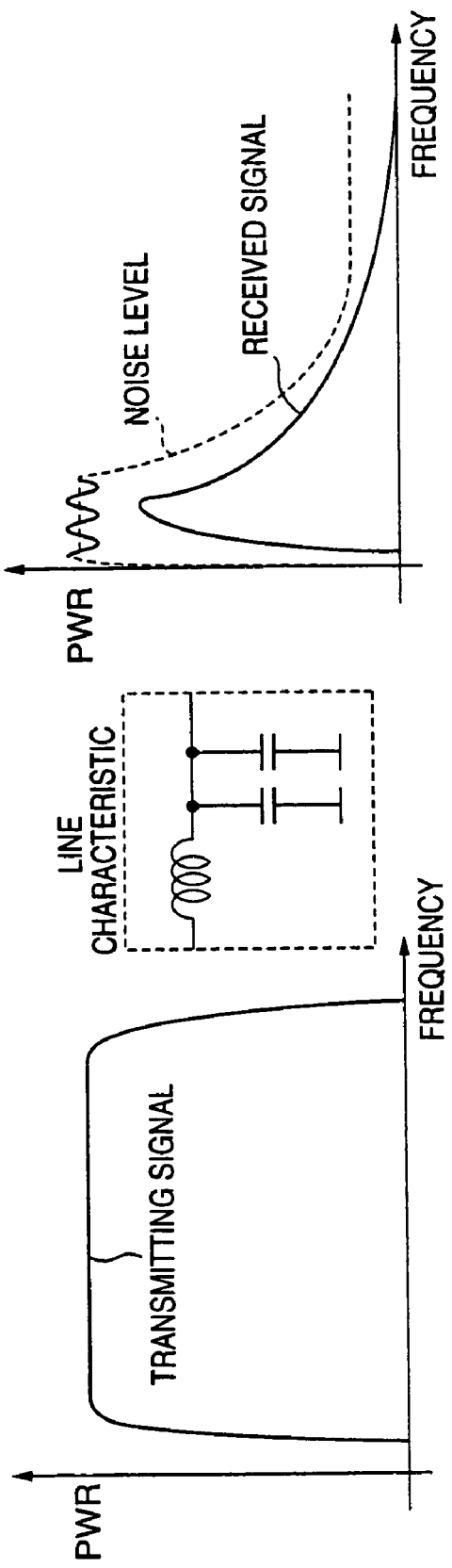

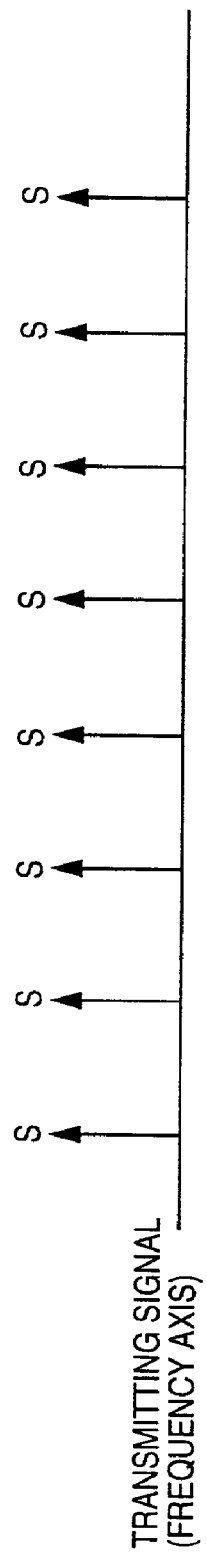
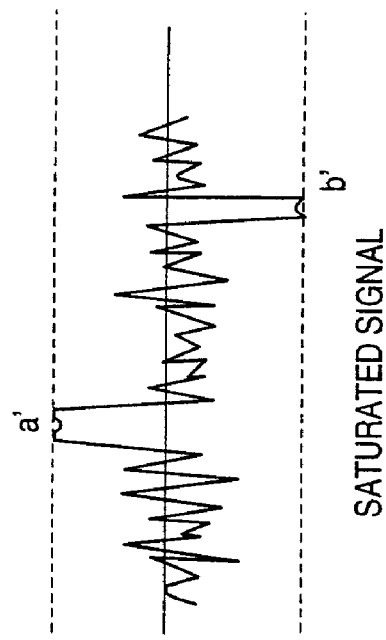
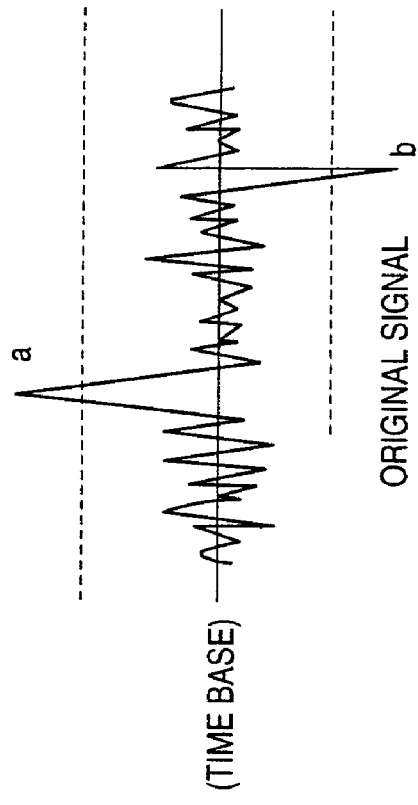

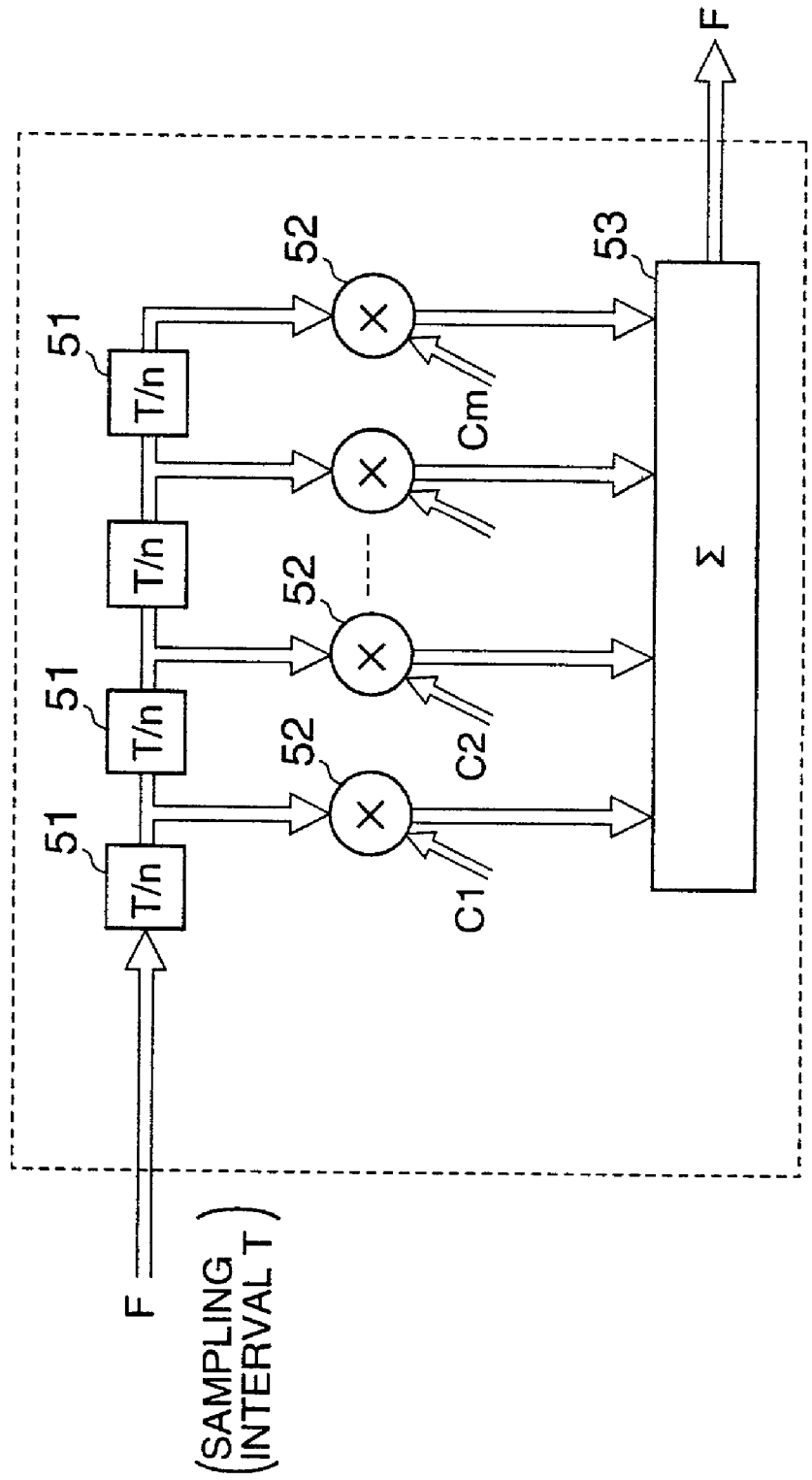

PEAK SUPPRESSION METHOD AND DATA TRANSMISSION APPARATUS

BACKGROUND OF THE INVENTION

This application claims the benefit of a Japanese Patent Application No.2001-186273 filed Jun. 20, 2001, in the Japanese Patent Office, the disclosure of which is hereby incorporated by reference.

1. Field of the Invention

The present invention generally relates to peak suppression methods and data transmission apparatuses, and more particularly to a peak suppression method for suppressing a peak of a transmitting signal power in a system which transmits data by multi-carrier at a high speed so as not to deteriorate a signal-to-noise (S/N) ratio on a receiver end, and to a data transmission apparatus which transmits data by suppressing a peak of a transmitting signal.

Multi-carrier data transmission which uses multi-carrier is applicable to various transmission systems including cable transmission such as ADSL and SDSL, wireless transmission such as OFDM, and optical transmission such as WDM.

2. Description of the Related Art

In systems which transmit data via cable, wireless and optical transmission channels, there are demands to improve the data transmission rate. In addition, among cable data transmission systems, there are proposed systems which utilize an existing distribution line. There is also a distribution system which supplies power from a substation to each transformer via a 6.6 kV high-voltage distribution line, for example, and steps down the voltage to 100 V or 200 V at each transformer, so as to supply the power to homes or the like via a low-voltage distribution line. As means of effectively utilizing the last-one-mile, various data transmission systems have been proposed which utilize the low-voltage distribution line as a data transmission line.

In the data transmission system which utilizes the low-voltage distribution line, the high-voltage distribution line side utilizes an optical fiber transmission line which is set up along the high-voltage distribution line, connects this optical fiber transmission line and the low-voltage distribution line by a modem, and connects a terminal equipment and the low-voltage distribution line by a modem, so as to make the data transmission in the last-one-mile using the low-voltage distribution line as the data transmission line. In this case, operating power to the terminal equipment is supplied via the low-voltage distribution line. Hence, terminal equipment can make the data transmission using the internal modem of the terminal equipment, by simply connecting a power line of the terminal equipment to a plug socket.

In this case, an outdoor low-voltage distribution line is equivalent to an inductance of approximately 1 $\mu$H/m, for example, and an indoor low-voltage distribution line is equivalent to a capacitance of approximately 75 pF/m, for example. Accordingly, if the length of the low-voltage distribution line is 150 m, for example, such that the length of a service wire is 50 m for 30 homes, a line characteristic becomes equivalent to a connection of an inductance of 150 $\mu$H and a capacitance of 0.1125 $\mu$F. Since noise eliminating capacitors are connected to various home appliances, an impedance of the low-voltage distribution line when viewed from the modem on the optical fiber side has relatively large inductance and capacitance.

When transmitting the data using such a low-voltage distribution line, a transmitting signal having a power (PWR) versus frequency characteristic shown in FIG. 1A is transmitted from a modem of a mast or pole side. Since the low-voltage distribution line has a line characteristic including inductance and capacitance as shown in FIG. 1B, a lowpass filter characteristic is obtained. Accordingly, the low-voltage distribution line has a reception characteristic shown in FIG. 1C having a large attenuation in a high frequency region. The noise generated from the home appliances such as an inverter equipment has a relatively large power in a low frequency region. In the case of a noise level indicated by a dotted line and a received signal indicated by a solid line in FIG. 1C, the received signal becomes buried in the noise.

It is conceivable to cut the low frequency region where the noise level is high, as shown in FIG. 2A, so as to transmit the data utilizing the high frequency region where the noise level is low. However, the S/N ratio is not improved by cutting the low frequency region where the received signal level is high. For this reason, various proposals have been made to improve the S/N ratio by positively cancelling the noise. FIG. 2B shows a case where the noise in the low frequency region is cancelled. As shown in FIG. 2B, the S/N ratio can be improved as a whole since the received signal level in the low frequency region becomes higher than the noise level.

On the other hand, an orthogonal frequency division multiplexing (OFDM) system transmits the data using multi-carrier, and each carrier is selected to have an orthogonal relationship. By using the multi-carrier to make the multiplexed transmission, it is possible to allocate the carrier frequencies by avoiding a band where the noise level is large, for example. A discrete multi-tone (DMT) system also transmits the data using a plurality of carriers, and is used as an asymmetric digital subscriber line (ADSL) modulation system, for example.

A transmitting analog section of a data transmission apparatus has a structure shown in FIG. 3, for example. The transmitting analog section shown in FIG. 3 includes a digital-to-analog (D/A) converter 101, a lowpass filter (LPF) 102, a gain adjusting part 103, a line driver 104, a line transformer 105, and a coupling filter 106. A transmitting signal is converted into an analog signal by the D/A converter 101, and is eliminated of an unwanted high-frequency component in the lowpass filter 102. A line output signal level is adjusted by the gain adjusting part 103, so that the line driver 104 and the like will not saturate. The output of the gain adjusting part 103 is transmitted to a low-voltage distribution line via the line driver 104, the line transformer 105 and the coupling filter 106 which couples to the AC line.

FIG. 4 is a system block diagram showing a conceivable data transmission apparatus. This data transmission apparatus corresponds to a modem which transmits and receives data by connecting to the low-voltage distribution line. The data transmission apparatus shown in FIG. 4 includes a code converter 111, a signal generator 112, an inverse fast Fourier transform (IFFT) section 113 including a guard time (GT) adding function, a zero point inserting section 114, a roll-off filter (ROF) 115, a modulator (MOD) 116, a digital-to-analog (D/A) converter 117, a lowpass filter (LPF) 118, a transmission clock generator (TX-CLK) 119, a bandpass filter (BPF) 120, an analog-to-digital (A/D) converter 121, a demodulator (DEM) 122, a roll-off filter (ROF) 123, a reception clock distributor (RX-CLK) 124, a timing extractor (TIM) 125, a phase locked loop (PLL) circuit 126 including a voltage controlled crystal oscillator (VCXO), a noise eliminating section 127, a fast Fourier transform (FFT) section 128 including a guard time (GT) deleting function, a signal deciding section (DEC) 129, a code converter 130. The code converter 111 includes the functions of a scrambler (SCR), a serial-to-parallel (S/P) converter, a Gray code/ natural code (G/N) converter, a sum computing unit and the like. On the other hand, the code converter 130 includes the functions of a parallel-to-serial (P/S) converter, a descrambler (DSCR), a difference computing unit, a natural code/ Gray code (N/G) converter and the like. In FIG. 4, TX-line denotes a transmission line, RX-line denotes a reception line, SD denotes a transmitting signal, and RD denotes a received signal.

A clock signal generated from the transmission clock generator 119 is supplied to various parts within the data transmission apparatus, including the zero point inserting section 114 which receives the clock signal as a zero point insertion timing signal. The transmitting signal SD is subjected to processes including a scrambling process, a S/P conversion in correspondence with the number of carriers, G/N conversion, the sum operation to enable a difference operation at the receiving end, and the like, in the code converter 111. The signal from the code converter 111 is supplied to the signal point generator 112 which generates signal points at Nyquist intervals, and the IFFT section 113 carries out the addition of the guard time (GT) and the IFFT process. The zero point inserting section 114 inserts a zero point indicating a level 0 depending on the zero point insertion timing signal, and the roll-off filter 115 carries out a wave-shaping with respect to the output of the zero point inserting section 114. The modulator 116 subjects the output of the roll-off filter 115 to a digital modulation, and the D/A converter 117 converts the output of the modulator 116 to an analog signal. The analog signal from the D/A converter 117 is formed into a signal having a transmission band of 10 kHz to 450 kHz, for example, by the lowpass filter 118, and is transmitted to the transmission line TX-line.

The reception clock distributor 124 distributes to various parts within the data transmission apparatus a clock signal which is based on a clock signal received from the PLL circuit 126. The signal received via the reception line RX-line is supplied to the bandpass filter 120 which passes a signal having a band of 10 kHz to 450 kHz, for example. The output signal of the bandpass filter 120 is converted into a digital signal by the A/D converter 121 and is then demodulated by the demodulator 122. The roll-off filter 123 subjects the output of the demodulator 122 to a wave-shaping. The noise eliminating section 127 obtains a noise level multiplexed to the zero point position based on the clock signal received from the reception clock distributor 124, obtains a noise level of the signal point by carrying out an interpolation process, and eliminates the noise multiplexed to the signal point. The FFT section 128 deletes the guard time (GT) and carries out a conversion to a frequency region with respect to the output of the noise eliminating section 127. The signal from the FFT section 128 is judged (or decoded) by the signal deciding section 129. With respect to the output of the signal deciding section 129, the code converter 130 carries out processes such as P/S conversion, descrambling process, difference operation and N/G conversion, so as to output the received signal RD.

In the case of a data transmission via a data transmission line, such as the low-voltage distribution line and the wireless line, into which large noise mixes, the above described structure of the data transmission apparatus enables the receiving end to detect the timing of the zero point which is inserted at the transmitting end, so that the noise may be cancelled based on the noise level at the detected timing. As described above with reference to FIG. 2B, it is possible to improve the S/N ratio.

The data transmission apparatus described above carries out the data transmission by multi-carrier. Hence, if a monotone signal is transmitted by each of the multi-channels, for example, the required signal energy becomes a sum of the signal energies of the channels. For example, when making the transmission by allocating transmitting signals S to each of the carriers on the frequency axis in FIG. 5A, the signals of each of the channels are added on the time base. As a result, the signal levels of the original signal shown in FIG. 5B greatly change depending on the match or mismatch of the phase, level and the like of the signals of each of the channels. For example, signals "a" and "b" which exceed levels indicated by dotted lines in FIG. 5B become saturated signals a' and b' as shown in FIG. 5C due to saturation caused by the characteristic of the line driver 104 and the like. When such a saturation occurs, the distortion of the received signal becomes large, to greatly deteriorate the S/N ratio.

In this case, if the number of channels is denoted by n and a peak to average ratio (a peak value with respect to an average value) is denoted by PAR, the peak to average ratio PAR can be described by PAR=3.01+10 log n [dB]. For example, when making the transmission by multiplexing 64 channels, n=64 and PAR=+21.07 [dB]. Accordingly, it is necessary to reduce the transmission level to avoid saturation, and for example, it is necessary to reduce the gain of the gain adjusting section 103 in the transmitting section of the data transmission apparatus shown in FIG. 4.

But when the transmission level is reduced, no saturation occurs at the peak point, but the reception level is also reduced, thereby deteriorating the S/N ratio. For this reason, even if the noise elimination is made based on the zero point insertion by the structure shown in FIG. 4, the S/N ratio assumes a negative value, and it may become impossible to make a high-speed data transmission.

SUMMARY OF THE INVENTION

Accordingly, it is a general object of the present invention to provide a novel and useful peak suppression method and data transmission apparatus, in which the problems described above are eliminated.

Another and more specific object of the present invention is to provide a peak suppression method and a data transmission apparatus which enable a data transmission by suppressing a peak of a transmission level without deteriorating the S/N ratio.

Still another object of the present invention is to provide a peak suppression method comprising the steps of (a) detecting a peak value exceeding a threshold value of a transmitting signal; (b) forming a peak value prediction signal which is limited to a noise cancelling frequency band of a receiving end, based on the detected peak value of the transmitting signal; and (c) subtracting the peak value prediction signal from the transmitting signal. According to the peak suppression method of the present invention, the peak suppression is carried out such that the peak value is not simply cut off, but is multiplexed as a noise component. Hence, at the receiving end, it is possible to restore the transmitting signal which has been subjected to the peak suppression in a noise cancelling stage. Therefore, it is possible to solve the saturation problem of the line driver and the like due to the peak of the transmitting signal in a multi-carrier transmission, to thereby improve the S/N ratio and to enable a high-speed data transmission.

A further object of the present invention is to provide a peak suppression method comprising the steps of (a) calculating a power of a transmitting signal; (b) comparing the power of the transmitting signal and a threshold value, and selectively outputting, as a selection output signal, a peak value of the transmitting signal by judging the peak value of the transmitting signal when the power of the transmitting signal exceeds the threshold value, and a zero point signal having a zero level when the power of the transmitting signal does not exceed the threshold value; (c) frequency-shifting the selection output signal, band-limiting the frequency shifted signal to a noise cancelling frequency band of a receiving end, and reverse frequency-shifting the band-limited signal to a frequency band of the transmitting signal, so as to form a peak value prediction signal; and (d) subtracting the peak value prediction signal from the transmitting signal. According to the peak suppression method of the present invention, the peak suppression is carried out such that the peak value is not simply cut off, but is multiplexed as a noise component. Hence, at the receiving end, it is possible to restore the transmitting signal which has been subjected to the peak suppression in a noise cancelling stage. Therefore, it is possible to solve the saturation problem of the line driver and the like due to the peak of the transmitting signal in a multi-carrier transmission, to thereby improve the S/N ratio and to enable a high-speed data transmission.

Another object of the present invention is to provide a peak suppression method comprising the steps of (a) calculating a power or an amplitude of a transmitting signal; (b) comparing the power or amplitude of the transmitting signal and a threshold value, and selectively outputting, as a selection output signal, a peak value of the transmitting signal by judging the peak value of the transmitting signal when the power or amplitude of the transmitting signal exceeds the threshold value, and a zero point signal having a zero level when the power or amplitude of the transmitting signal does not exceed the threshold value; (c) frequency-shifting the selection output signal by a rotation vector signal by separating the selection output signal into a real number portion and an imaginary number portion, band-limiting the frequency shifted signal to a noise cancelling frequency band of a receiving end, and reverse frequency-shifting the band-limited signal by the rotation vector signal to a frequency band of the transmitting signal, so as to form a peak value prediction signal by a real number portion of the reverse frequency-shifted signal; and (d) subtracting the peak value prediction signal from the transmitting signal. According to the peak suppression method of the present invention, the peak suppression is carried out such that the peak value is not simply cut off, but is multiplexed as a noise component. Hence, at the receiving end, it is possible to restore the transmitting signal which has been subjected to the peak suppression in a noise cancelling stage. Therefore, it is possible to solve the saturation problem of the line driver and the like due to the peak of the transmitting signal in a multi-carrier transmission, to thereby improve the S/N ratio and to enable a high-speed data transmission.

Still another object of the present invention is to provide a data transmission apparatus adapted to a multi-carrier transmission, comprising a detector detecting a peak value of a transmitting signal exceeding a threshold value; a signal forming section forming a peak value prediction signal which is band-limited to a noise cancelling frequency band of a receiving end, based on the peak value of the transmitting signal; and a subtracter subtracting the peak value prediction signal from the peak value of the transmitting signal. According to the data transmission apparatus of the present invention, the peak suppression is carried out such that the peak value is not simply cut off, but is multiplexed as a noise component. Hence, at the receiving end, it is possible to restore the transmitting signal which has been subjected to the peak suppression in a noise cancelling stage. Therefore, it is possible to solve the saturation problem of the line driver and the like due to the peak of the transmitting signal in a multi-carrier transmission, to thereby improve the S/N ratio and to enable a high-speed data transmission.

A further object of the present invention is to provide a data transmission apparatus adapted to a multi-carrier transmission, comprising a zero point inserting section inserting a zero point signal at predetermined intervals with respect to signal points to output a transmitting signal; and a peak suppressing section, coupled at a stage subsequent to the zero point inserting section, detecting a peak value of the transmitting signal exceeding a threshold value and forming a peak value prediction signal which is band-limited to a noise cancelling frequency band of a receiving end based on the detected peak value of the transmitting signal, and carrying out a peak suppression by subtracting the peak value prediction signal from the peak value of the transmitting signal. According to the data transmission apparatus of the present invention, the peak suppression is carried out such that the peak value is not simply cut off, but is multiplexed as a noise component. Hence, at the receiving end, it is possible to restore the transmitting signal which has been subjected to the peak suppression in a noise cancelling stage. Therefore, it is possible to solve the saturation problem of the line driver and the like due to the peak of the transmitting signal in a multi-carrier transmission, to thereby improve the S/N ratio and to enable a high-speed data transmission.

Another object of the present invention is to provide a data transmission apparatus adapted to a multi-carrier transmission, comprising a zero point inserting section inserting a zero point signal at predetermined intervals with respect to signal points to output a transmitting signal; a roll-off filter, coupled at a stage subsequent to the zero point inserting section, shaping the transmitting signal; and a peak suppressing section detecting a peak value of the transmitting signal output from the roll-off filter and exceeding a threshold value and forming a peak value prediction signal which is band-limited to a noise cancelling frequency band of a receiving end based on the detected peak value of the transmitting signal, and carrying out a peak suppression by subtracting the peak value prediction signal from the peak value of the transmitting signal. According to the data transmission apparatus of the present invention, the peak suppression is carried out such that the peak value is not simply cut off, but is multiplexed as a noise component. Hence, at the receiving end, it is possible to restore the transmitting signal which has been subjected to the peak suppression in a noise cancelling stage. Therefore, it is possible to solve the saturation problem of the line driver and the like due to the peak of the transmitting signal in a multi-carrier transmission, to thereby improve the S/N ratio and to enable a high-speed data transmission.

Still another object of the present invention is to provide a data transmission apparatus adapted to a multi-carrier transmission, comprising a zero point inserting section inserting a zero point signal at predetermined intervals with respect to signal points to output a transmitting signal; a roll-off filter, coupled at a stage subsequent to the zero point inserting section, shaping the transmitting signal; a modulator digitally modulating the shaped transmitting signal output from the roll-off filter; and a peak suppressing section detecting a peak value of the modulated transmitting signal output from the modulator and exceeding a threshold value and forming a peak value prediction signal which is band-limited to a noise cancelling frequency band of a receiving end based on the detected peak value of the modulated transmitting signal, and carrying out a peak suppression by subtracting the peak value prediction signal from the peak value of the modulated transmitting signal. According to the data transmission apparatus of the present invention, the peak suppression is carried out such that the peak value is not simply cut off, but is multiplexed as a noise component. Hence, at the receiving end, it is possible to restore the transmitting signal which has been subjected to the peak suppression in a noise cancelling stage. Therefore, it is possible to solve the saturation problem of the line driver and the like due to the peak of the transmitting signal in a multi-carrier transmission, to thereby improve the S/N ratio and to enable a high-speed data transmission.

A further object of the present invention is to provide a data transmission apparatus adapted to a multi-carrier transmission, comprising a transmitting section; and a receiving section, where the transmitting section comprises a zero point inserting section inserting a zero point signal at predetermined intervals with respect to signal points to output a transmitting signal, and a peak suppressing section, coupled at a stage subsequent to the zero point inserting section, detecting a peak value of the transmitting signal exceeding a threshold value and forming a peak value prediction signal which is band-limited to a noise cancelling frequency band of the receiving section based on the detected peak value of the transmitting signal, and carrying out a peak suppression by subtracting the peak value prediction signal from the peak value of the transmitting signal, and the receiving section comprises a decimator decimating a position corresponding to the signal point of a received signal to extract a noise component of a zero point signal position, an interpolator interpolating a noise component of a signal point position by the noise component of the zero point signal position, and a noise eliminating section cancelling a noise multiplexed to the received signal by the noise component of the signal point position. According to the data transmission apparatus of the present invention, the peak suppression is carried out such that the peak value is not simply cut off, but is multiplexed as a noise component. Hence, at the receiving end, it is possible to restore the transmitting signal which has been subjected to the peak suppression in a noise cancelling stage. Therefore, it is possible to solve the saturation problem of the line driver and the like due to the peak of the transmitting signal in a multi-carrier transmission, to thereby improve the S/N ratio and to enable a high-speed data transmission.

Other objects and further features of the present invention will be apparent from the following detailed description when read in conjunction with the accompanying drawings.

BRIEF DESCRIPTION OF THE DRAWINGS

FIGS. 1A through 1C respectively are diagrams for explaining a data transmission characteristic of a low-voltage distribution line;

FIGS. 5A through 5C respectively are diagrams for explaining a transmitting signal;

FIG. 13 is a diagram for explaining a band-limiting lowpass filter;

DESCRIPTION OF THE PREFERRED EMBODIMENTS

Figure 6:
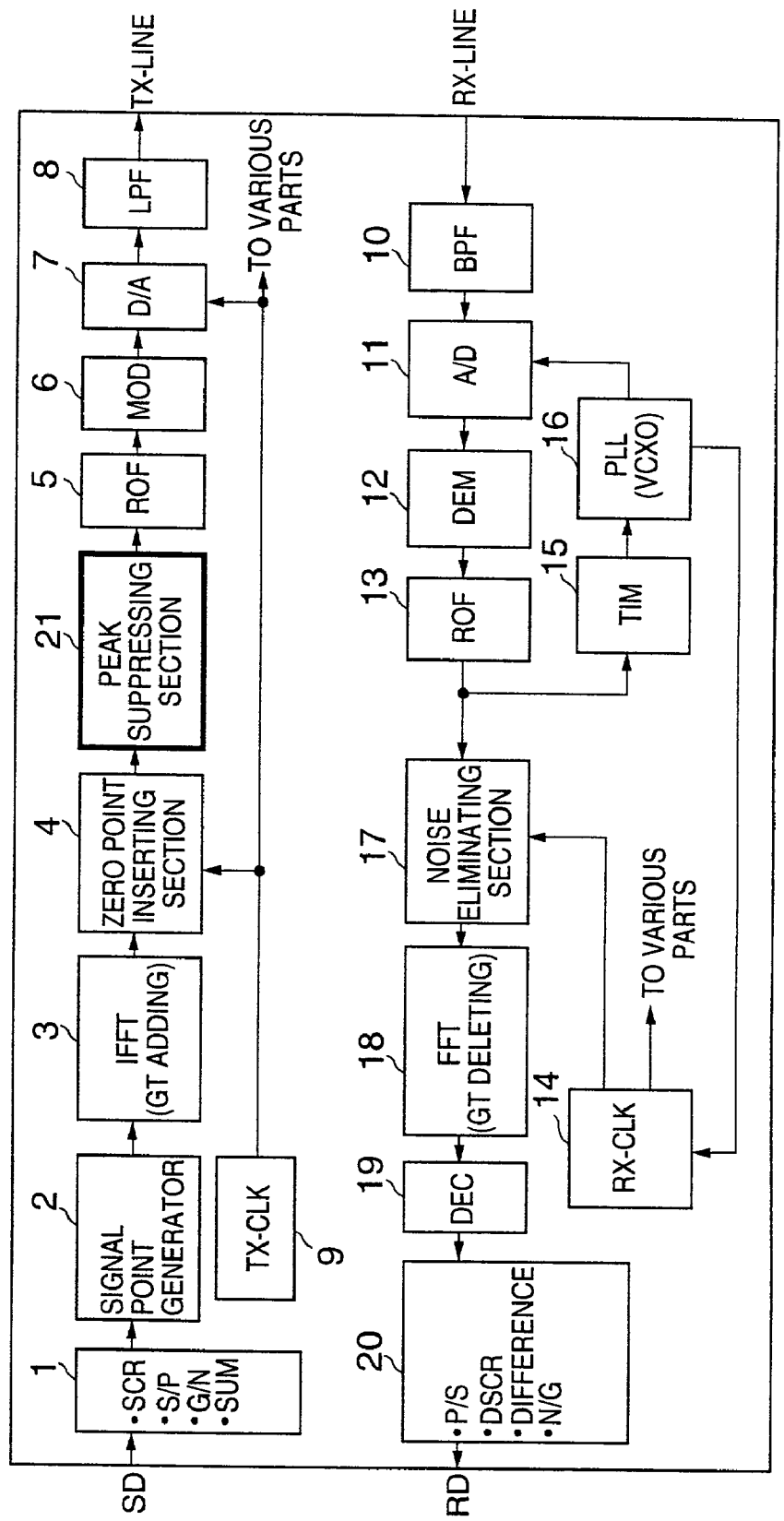
FIG. 6 is a system block diagram showing a first embodiment of a data transmission apparatus according to the present invention.

FIG. 6 is a system block diagram showing a first embodiment of a data transmission apparatus according to the present invention. This first embodiment of the data transmission apparatus employs a first embodiment of a peak suppression method according to the present invention. The data transmission apparatus shown in FIG. 6 includes a code converter 1, a signal generator 2, an inverse fast Fourier transform (IFFT) section 3 including a guard time (GT) adding function, a zero point inserting section 4, a peak suppressing section 21, a roll-off filter (ROF) 5, a modulator (MOD) 6, a digital-to-analog (D/A) converter 7, a lowpass filter (LPF) 8, and a transmission clock generator (TX-CLK) 9 which form a transmitting section. The code converter 1 includes the functions of a scrambler (SCR), a serial-to-parallel (S/P) converter, a Gray code/natural code (G/N) converter, a sum computing unit and the like. TX-line denotes a transmission line.

The data transmission apparatus also includes a bandpass filter (BPF) 10, an analog-to-digital (A/D) converter 11, a demodulator (DEM) 12, a roll-off filter (ROF) 13, a reception clock distributor (RX-CLK) 14, a timing extractor (TIM) 15, a phase locked loop (PLL) circuit 16 including a voltage controlled crystal oscillator (VCXO), a noise eliminating section 17, a fast Fourier transform (FFT) section 18 including a guard time (GT) deleting function, a signal deciding section (DEC) 19, and a code converter 20 which form a receiving section. The code converter 20 includes the functions of a parallel-to-serial (P/S) converter, a descrambler (DSCR), a difference computing unit, a natural code/Gray code (N/G) converter and the like. RX-line denotes a reception line, SD denotes a transmitting signal, and RD denotes a received signal.

Figure 2A:
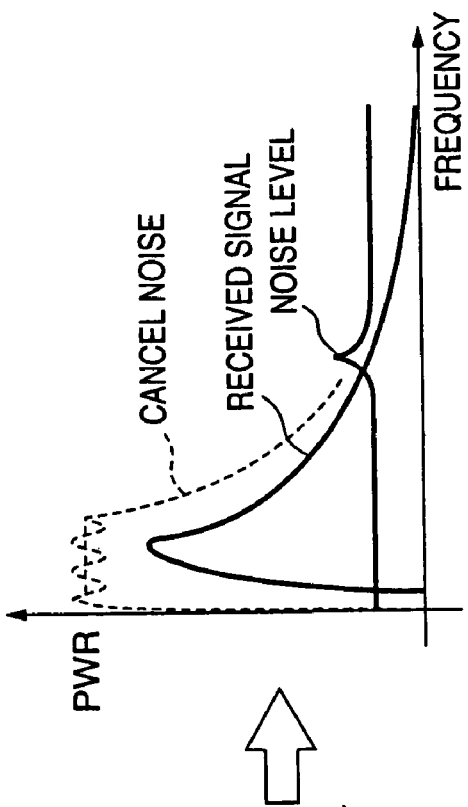
FIGS. 2A and 2B respectively are diagrams for explaining a conventional noise cancelling.
Figure 2B:
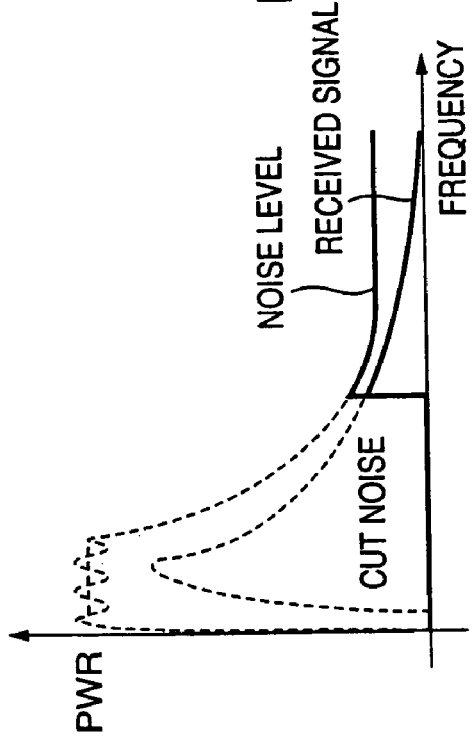
Figure 3:
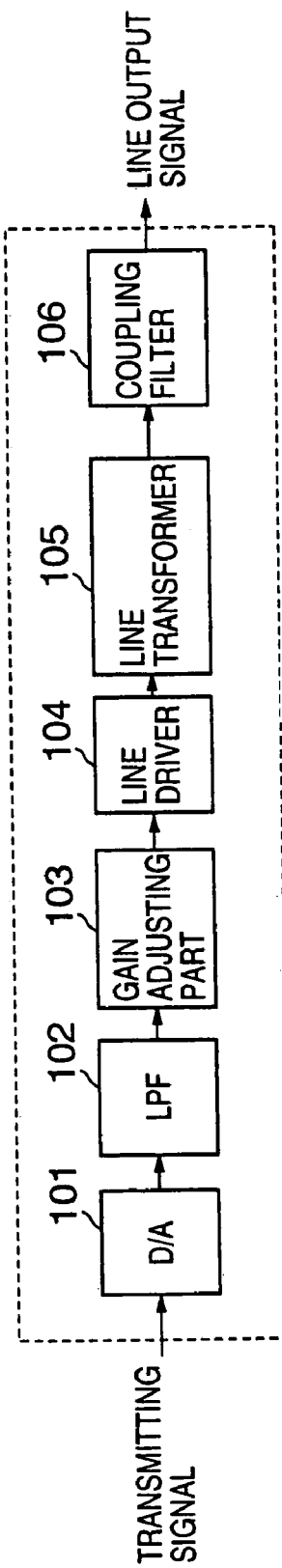
FIG. 3 is a system block diagram showing a conventional analog transmitting section.
Figure 4:
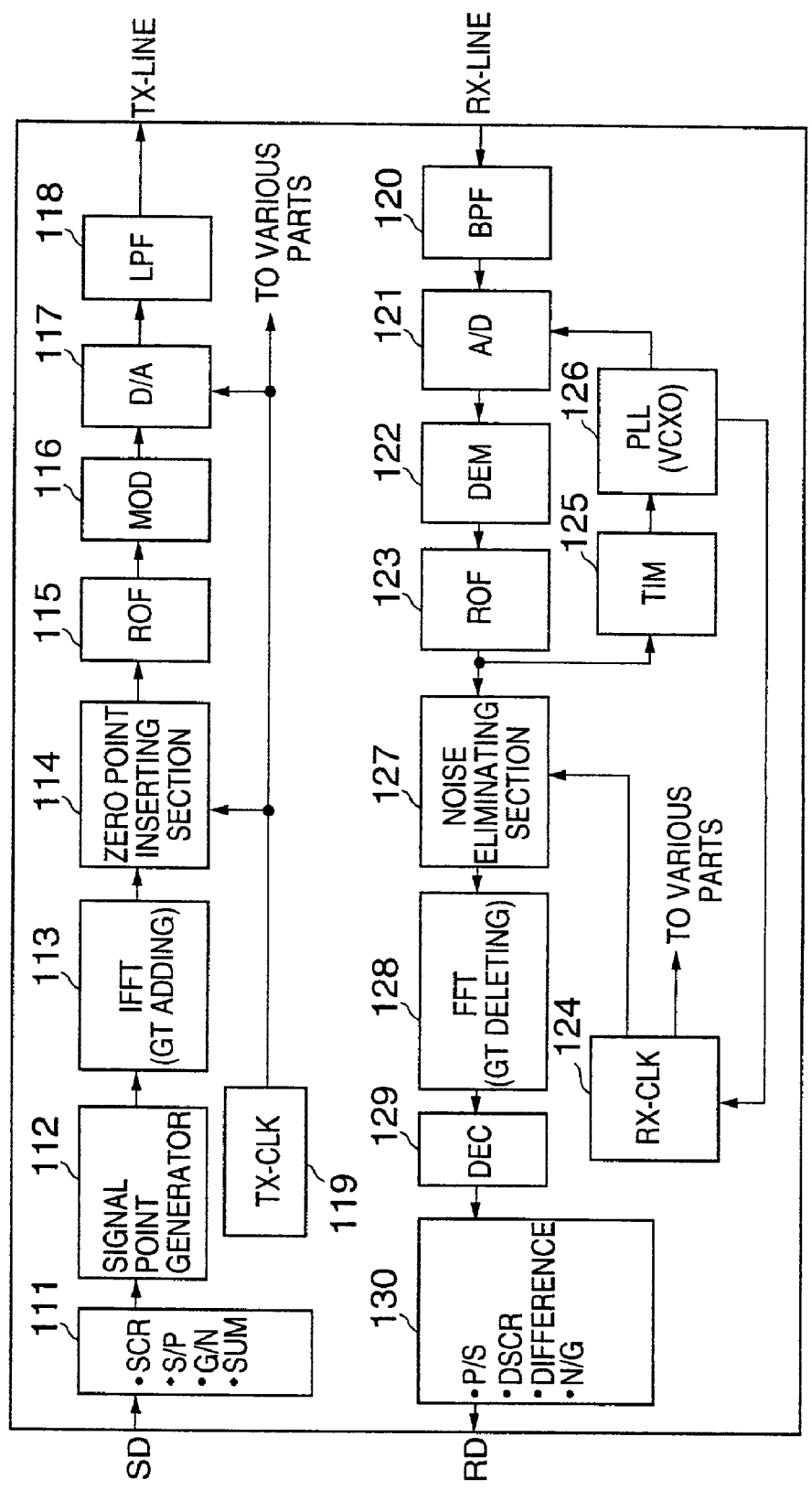
FIG. 4 is a system block diagram showing a conceivable data transmission apparatus.

The data transmission apparatus shown in FIG. 6 forms a modem, and the structure thereof is basically the same as that of the conceivable data transmission apparatus shown in FIG. 4 except for the provision of the peak suppressing section 21 of the transmitting section. In FIG. 6, the zero point inserting section 4 of the transmitting section inserts the zero point in the signal on the time base, and the noise eliminating section 17 of the receiving section eliminates the noise multiplexed to the signal point based on the noise component multiplexed to the zero point. In addition, by connecting the peak suppressing section 21 between the zero point inserting section 4 and the roll-off filter 5, and adding in the peak suppressing section 21 a signal component which enables the noise elimination in the noise eliminating section 17 of the receiving section, it becomes possible to equivalently suppress the peak of the transmitting signal.

Accordingly, by carrying out an equivalent peak suppression by the peak suppressing section 21 so as not to generate saturation in a line driver and the like, and utilizing the functions of the noise eliminating section 17 of the receiving end, it is possible to equivalently eliminate the signal component which is added for the peak suppression as noise and restore the original signal. Hence, it is possible to avoid saturation of the line driver and the like caused by the peak of the transmitting signal, and to not exceed a transmittable power of the data transmission line, so that the S/N ratio is improved.

Figure 7:
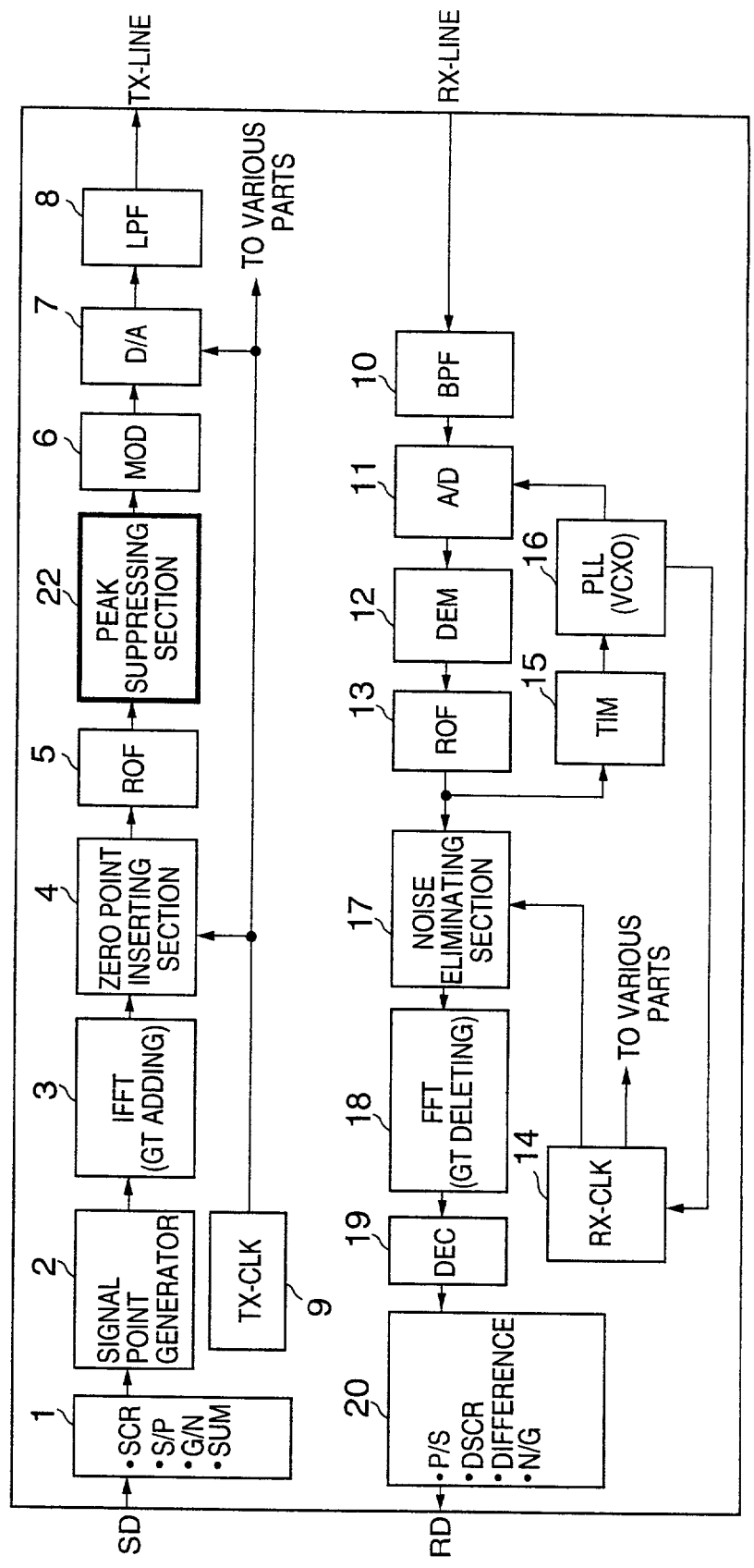
FIG. 7 is a system block diagram showing a second embodiment of the data transmission apparatus according to the present invention.

FIG. 7 is a system block diagram showing a second embodiment of the data transmission apparatus according to the present invention. In FIG. 7, those parts which are the same as those corresponding parts in FIG. 6 are designated by the same reference numerals, and a description thereof will be omitted. This second embodiment of the data transmission apparatus employs a second embodiment of the peak suppression method according to the present invention. In this second embodiment, a peak suppressing section 22 is provided between the roll-off filter 5 and the modulator 6 of the transmitting section. The peak suppressing section 22 detects a peak value of the transmitting signal after the wave-shaping in the roll-off filter 5, and forms a peak value prediction signal in a noise cancelling frequency band of the receiving end, based on the detected peak value of the transmitting signal. The peak suppressing section 22 subtracts the peak value prediction signal from the peak value of the transmitting signal, so as to input to the modulator 6 a transmitting signal which has been subjected to a peak suppression and to carry out a digital modulation. Accordingly, by adding in the peak suppressing section 22 a signal component which enables the noise elimination in the noise eliminating section 17 of the receiving section, similarly as in the case of the peak suppressing section 21, it becomes possible to equivalently suppress the peak of the transmitting signal.

Figure 8:
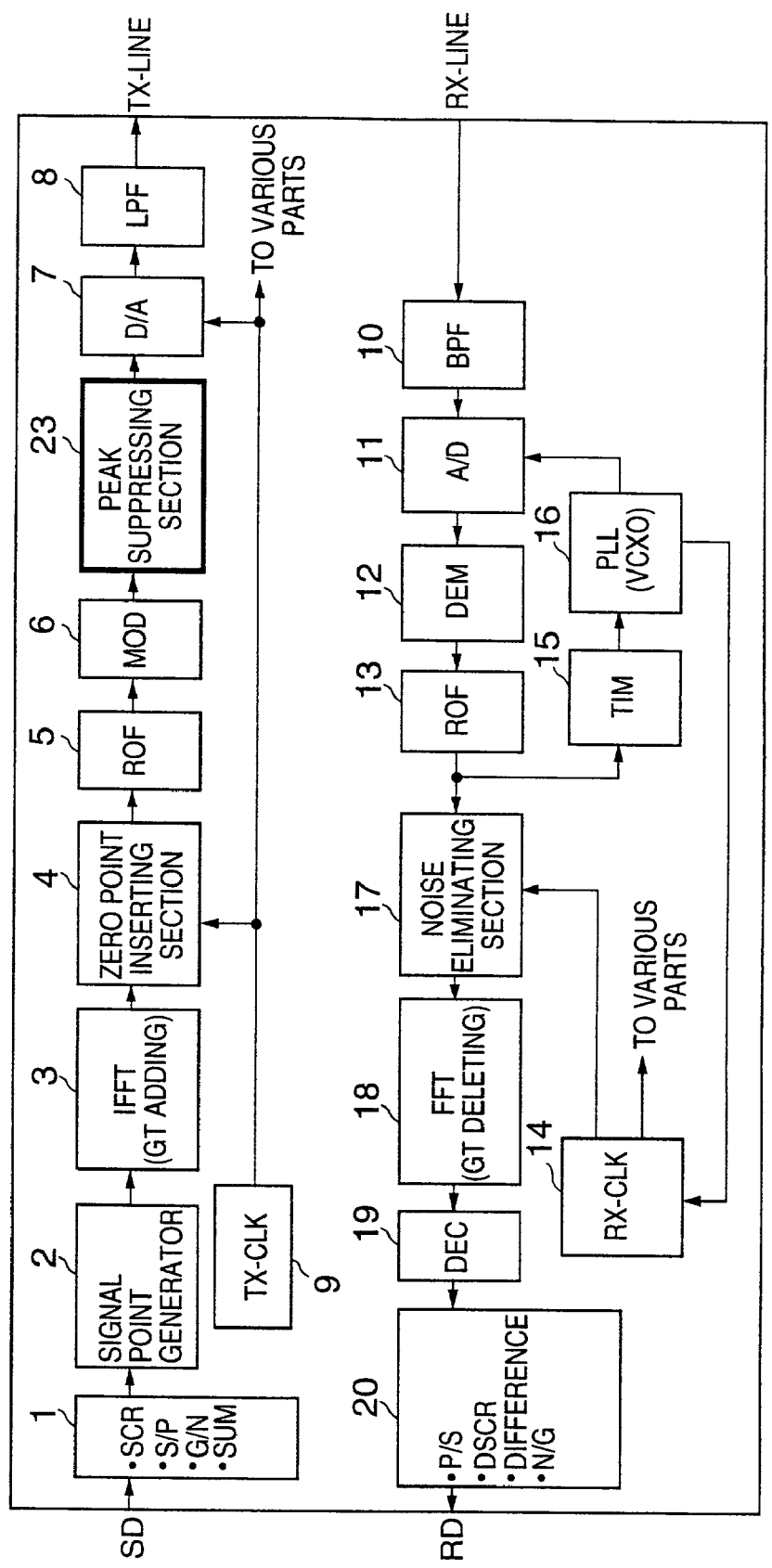
FIG. 8 is a system block diagram showing a third embodiment of the data transmission apparatus according to the present invention.

FIG. 8 is a system block diagram showing a third embodiment of the data transmission apparatus according to the present invention. In FIG. 8, those parts which are the same as those corresponding parts in FIG. 6 are designated by the same reference numerals, and a description thereof will be omitted. This third embodiment of the data transmission apparatus employs a third embodiment of the peak suppression method according to the present invention. In this third embodiment, a peak suppressing section 23 is provided between the modulator 6 and the D/A converter 7. The peak suppressing section 23 detects a peak value included in the modulated transmitting signal, and forms a peak value prediction signal in a noise cancelling frequency band of the receiving end, based on the detected peak value of the modulated transmitting signal. The peak of the modulated transmitting signal is suppressed using the peak value prediction signal. At the receiving end, the peak value prediction signal used for the peak suppression at the transmitting end is eliminated as the noise component in the noise eliminating section 17.

Figure 9:
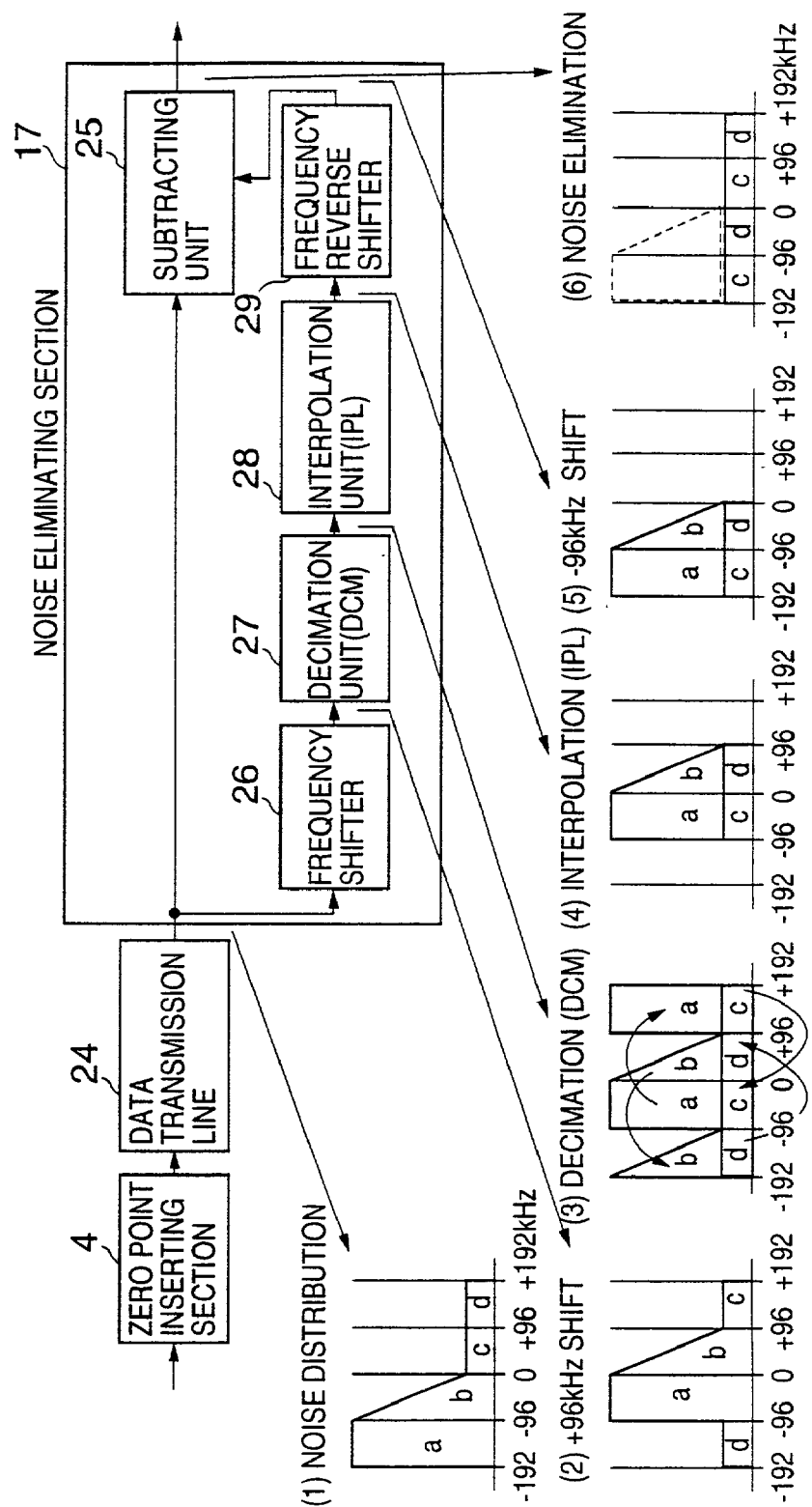
FIG. 9 is a diagram for explaining a noise eliminating section.

FIG. 9 is a diagram for explaining the noise eliminating section 17 in the receiving section of the data transmission apparatuses shown in FIGS. 6 through 8. FIG. 9 also shows the zero point inserting section 4, and a data transmission line 24 which corresponds to the transmission line TX-line and the reception line RX-line. The noise eliminating section 17 includes a subtracting unit 25, a frequency shifter 26, a decimation unit (DCM) 27, an interpolation unit (IPL) 28, and a frequency reverse shifter 29. When a symbol rate of the transmitting signal obtained via the code converter 1, the signal point generator 2 and the IFFT section 3 is 192 kB, for example, the zero point inserting section 4 inserts a zero point signal at predetermined intervals, and if one zero point signal is inserted between two symbols, the symbol rate becomes 384 kB which is two times the original symbol rate of 192 kB.

When the frequency band of the signal input to the zero point inserting section 4 is 192 kHz and the zero point is inserted between the signal points in this zero point inserting section 4, the number of signal points becomes doubled and the frequency band becomes 384 kHz. Assuming that the transmitting signal level within this frequency band is approximately constant, when the transmitting signal is transmitted to the data transmission line 24, the transmitting signal transmitted to the receiving end has a noise distribution indicated by "(1) noise distribution" in FIG. 9 if the center is indicated as 0 kHz. Of signal components "a", "b", "c" and "d" in the "(1) noise distribution", the level in the low frequency region is large. In other words, the data transmission line 24 includes a large amount of noise components in the low frequency region, and the noise attenuation is large in the high frequency region.

At the receiving end, the signal obtained via the bandpass filter 10, the A/D converter 11, the demodulator 12 and the roll-off filter 13 has the "(1) noise distribution" described above. Hence, a +96 kHz frequency shift, for example, is carried out by the frequency shifter 26 of the noise eliminating section 17. As indicated by "(2) +96 kHz shift" in FIG. 9, of the signal components "a", "b", "c" and "d" in the "(1) noise distribution", the signal component "a" of −192 kHz to −96 kHz is shifted to −96 kHz to 0 kHz, the signal component "b" of −96 kHz to 0 kHz is shifted to 0 kHz to +96 kHz, the signal component "c" of 0 kHz to +96 kHz is shifted to +96 kHz to 192 kHz, and the signal component "d" of +96 kHz to +192 kHz is shifted to −192 kHz to −96 kHz.

The decimation unit 27 decimates the signal points by a decimation process. This decimation process can be made responsive to the timing signal from the reception clock distributor 14. By decimating the signal points, a signal component corresponding to the noise component remains at the position of the zero point inserted at the transmitting end. As indicated by "(3) decimation (DCM)" in FIG. 9, aliasing components of the signal components "a", "b", "c" and "d" become multiplexed by the decimation process.

Next, the interpolation unit 28 obtains the signal component at the signal point by an interpolation process using the signal components of the zero points before and after the signal point. In other words, since the signal point is deleted by the decimation process, the level at the deleted signal point becomes 0. Hence, the noise component multiplexed at this signal point is obtained by the interpolation process using the signal component (noise component) multiplexed to the position of the zero point signal. Various known means may be used for this interpolation process, and as indicated by "(4) interpolation (IPL)" in FIG. 9, the signal components "a", "b", "c" and "d" fall in the range of ±96 kHz.

Then, the frequency reverse shifter 29 carries out a reverse shift with respect to the signal components which have been subjected to the interpolation process, that is, a shift of −96 kHz. This reverse frequency shift is carried out so that the frequency band of the noise component obtained by the interpolation process is shifted to the low frequency region of the received signal which is received via the data transmission line 24. Accordingly, as indicated by "(5) −96 kHz shift" in FIG. 9, the signal components "a", "b", "c" and "d" fall in the range of 0 kHz to −192 kHz. The subtracter 25 subtracts the signal components "a", "b", "c" and "d" shown under "(5) −96 kHz shift" from the signal components "a", "b", "c" and "d" shown under "(1) noise distribution" in FIG. 9.

Therefore, the signal components "a" and "b" of 0 kHz to −192 kHz shown under "(1) noise distribution" are eliminated by the signal components "a" and "b" shown under "(5) −96 kHz shift" in FIG. 9. In other words, as indicated by "(6) noise elimination" in FIG. 9, the noise component in the low frequency region indicated by a dotted line is cancelled in the signal which is output from the subtracter 25. Because a signal processing section provided at a stage subsequent to the noise eliminating section 17 processes the received signal which has been eliminated of the noise in this manner, it is possible to improve the S/N ratio and to realize a high-speed data transmission. In the above described case, one zero point is inserted between two signal points in the zero point inserting section 4 of the transmitting end. However, it is of course possible to insert a plurality of zero points, and in this case, the noise eliminating section 17 of the receiving end carries out the decimation process and the interpolation process correspondingly, so that the noise elimination is possible by obtaining the noise component multiplexed to the signal point.

Figure 10:
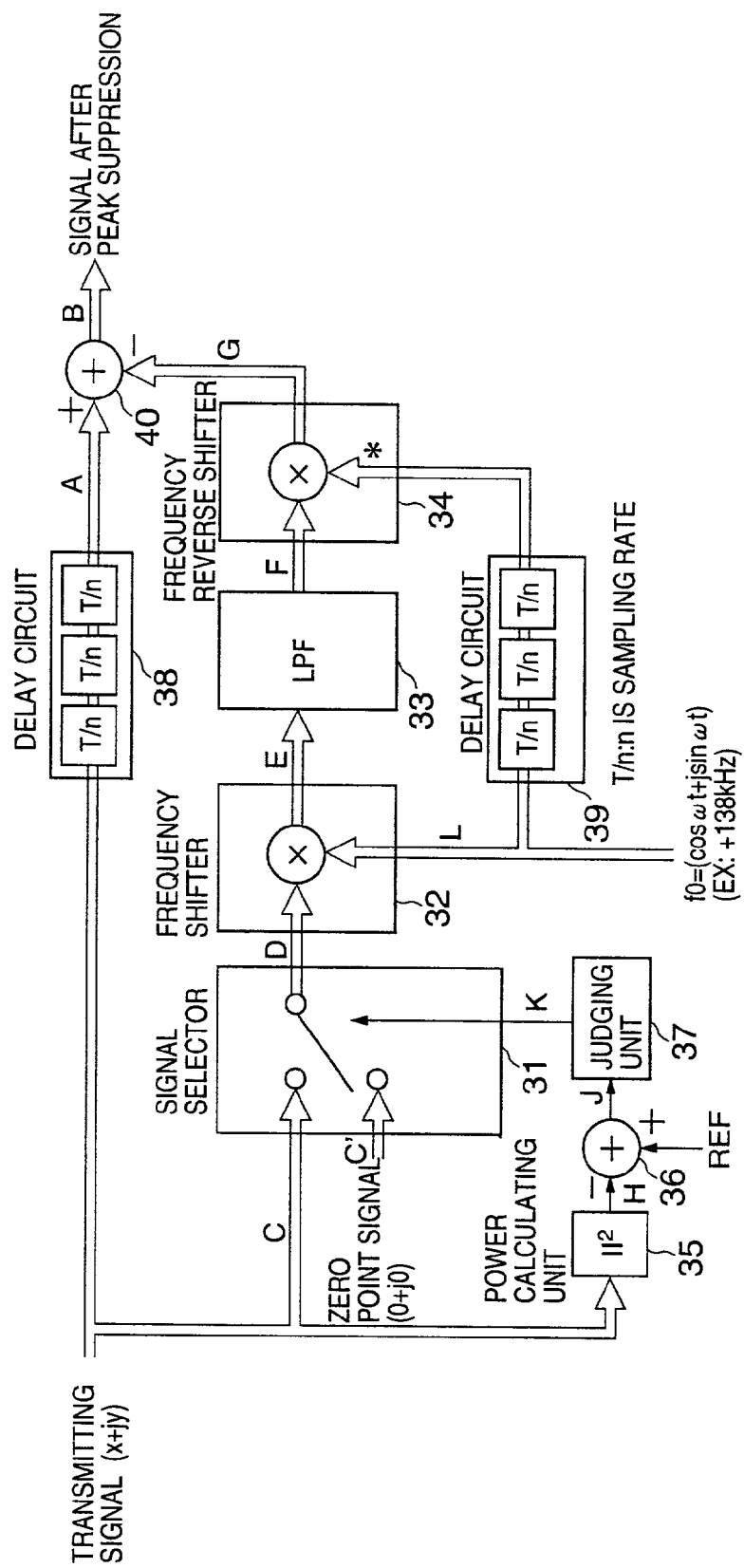
FIG. 10 is a diagram for explaining an embodiment of a peak suppressing section.

FIG. 10 is a diagram for explaining an embodiment of a peak suppressing section which may be used as any of the peak suppressing sections 21 through 23 described above. The peak suppressing section shown in FIG. 10 includes a signal selector 31, a frequency shifter 32, a band-limiting filter (lowpass filter) 33, a frequency reverse shifter 34, a power calculating unit 35, a subtracter 36, a judging unit 37, delay circuits 38 and 39 respectively made up of a plurality of delay elements (T/n), and a subtracter 40. In FIG. 10, A through C, C' through H, and J through L denote signals at various parts of the peak suppressing section, and T denotes a sampling interval.

The power calculating unit 35 obtains a square of a transmitting signal C (=x+jy), and obtains a transmitting signal power H (=$x^2+y^2$). The subtracter 36 subtracts the transmitting signal power H from a threshold value Ref. For example, the threshold value Ref is −20 dBm. An output signal J of the subtracter 36 is judged by the judging unit 37 which outputs a judgement output signal K. The signal selector 31 is controlled by the judgement output signal K. The signal selector 31 selectively supplies to the frequency shifter 32 the transmitting signal C (=x+jy) or a zero point signal C' (=0+j0).

In a case where the output signal J of the subtracter 36 takes a negative value, the judging unit 37 judges that the transmitting signal power H is larger than or equal to the threshold value Ref and is the peak value. In this case, the judging unit 37 controls the signal selector 31 by the judgement output signal K to selectively output the transmitting signal C. On the other hand, in a case where the output signal J of the subtracter 36 takes a positive value, the judging unit 37 judges that the transmitting signal power H is smaller than the threshold value Ref and is not the peak value. In this case, the judging unit 37 controls the signal selector 31 by the judgement output signal K to selectively output the zero point signal C'. Accordingly, the subtracter 36 and the judging unit 37 may be replaced by the functions of a comparator.

A selection output signal D of the signal selector 31 is frequency-shifted in the frequency shifter 32 to the noise cancelling frequency band of the noise eliminating section 17 shown in FIG. 6 of the receiving end, by the rotation vector signal L (f0=(cos ωt+j sin ωt)). For example, f0 may be set to f0=138 kHz. A frequency shifted signal E is band-limited to the noise cancelling frequency band of the receiving end by the band-limiting filter 33. An output signal F of the band-limiting filter 33 is reverse frequency-shifted in the frequency reverse shifter 34 by a rotation vector signal L which is delayed in the delay circuit 39 by a time required to carry out the band-limiting process in the band-limiting filter 33, and is output as a peak value prediction signal G. In FIG. 10, a symbol "*" indicates a complex conjugate, and by use of the complex conjugate of the rotation vector signal L, the frequency reverse shifter 34 can frequency-shift in a reverse direction to the frequency shift in the frequency shifter 32.

A transmitting signal A which has been delayed in the delay circuit 38 to compensate for the processing time is supplied to the subtracter 40. The subtracter 40 subtracts the peak value prediction signal G from the transmitting signal A, and outputs a signal B which has been subjected to the peak suppression process. By subtracting the peak value prediction signal G from the transmitting signal A, the noise eliminating section 17 of the receiving end can eliminate the noise by regarding the signal component corresponding to the peak value prediction signal G as the noise. In other words, the peak suppression of the transmitting signal A is made by regarding the peak value prediction signal G as the noise component, and extracting the noise component at the receiving end to obtain the original signal component by subtracting the noise component from the signal points. As a result, it is possible to eliminate the problem of saturation without deteriorating the transmitting signal level as a whole by the peak suppression process, and in addition, it is possible to realize a noise suppression to thereby improve the S/N ratio. The delay time of each of the delay circuits 38 and 39 may be set by selecting the number of delay elements which are connected so as to compensate for the corresponding signal processing time.

Figure 11A:
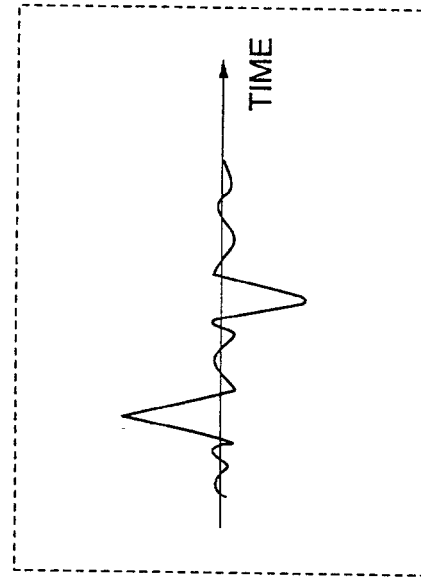
FIGS. 11A through 11G respectively are diagrams for explaining signal waveforms at various parts of the noise eliminating section.
Figure 11G:
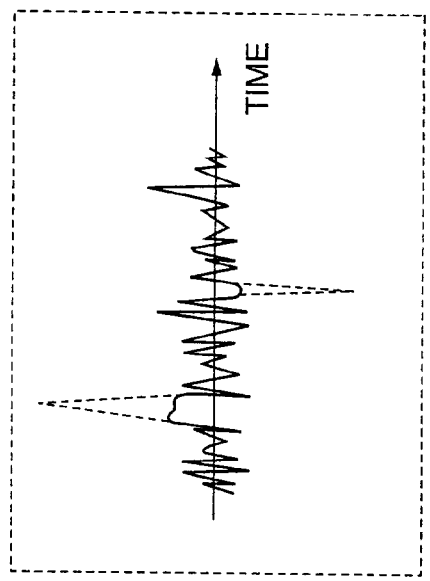
Figure 11B:
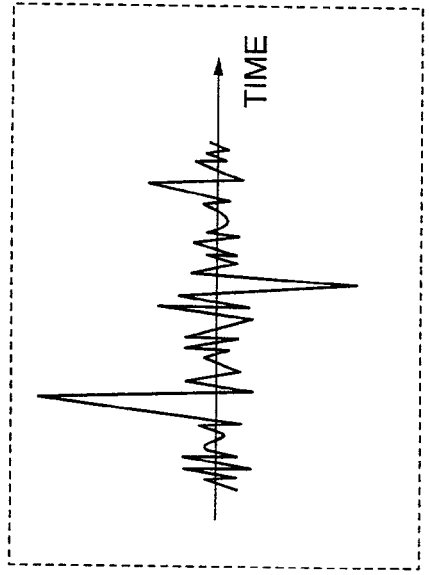
Figure 11C:
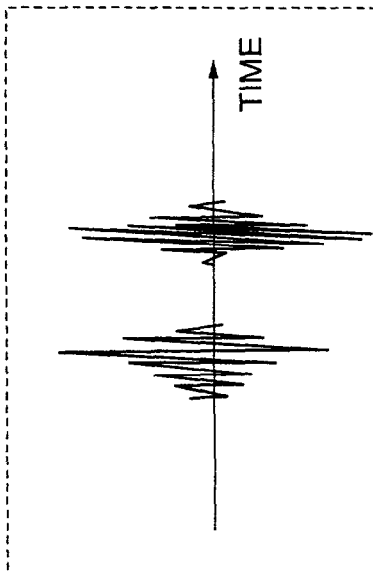
Figure 11D:
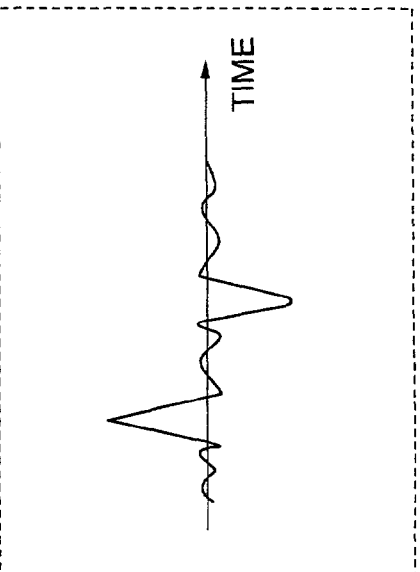
Figure 11E:
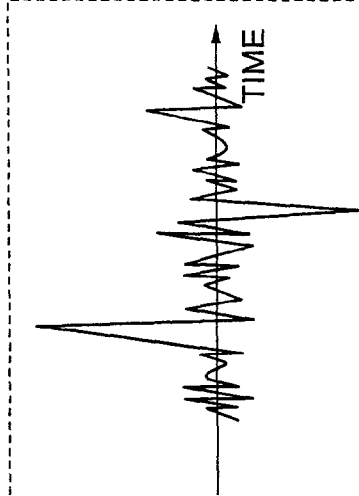
Figure 11F:
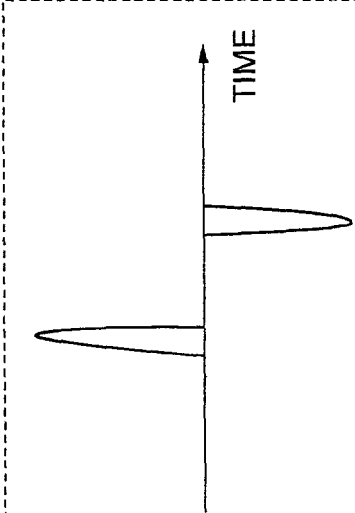

FIGS. 11A through 11G respectively are diagrams for explaining signal waveforms at various parts of the noise eliminating section shown in FIG. 10. FIG. 11A shows the transmitting signal A output from the delay circuit 38, and FIG. 11B shows the signal B, after the peak suppression, output from the subtracter 40. FIG. 11C shows the transmitting signal C input to the noise eliminating section, FIG. 11D shows the selection output signal D from the signal selector 31, and FIG. 11E shows the frequency shifted signal E from the frequency shifter 32. FIG. 11F shows the band-limited signal F from the band-limiting filter 33, and FIG. 11G shows the peak value prediction signal G from the frequency reverse shifter 34. In other words, only the portion of the input transmitting signal C having a power exceeding the threshold value Ref is output from the signal selector 31 as the selection output signal D, and this selection output signal D is frequency-shifted and band-limited to the signal F. Based on this signal F, that is, the peak value of the transmitting signal C, the peak value prediction signal G in the noise cancelling frequency band of the receiving end is formed, and this peak value prediction signal G is subtracted from the delayed transmitting signal A to obtain the signal B after the peak suppression. In FIG. 11B, the signal waveform indicated by a dotted line corresponds to the peak value of the delayed transmitting signal A, and the signal waveform indicated by a solid line corresponds to the transmitting signal B which has been subjected to the peak suppression by the peak value prediction signal G.

Figure 12A:
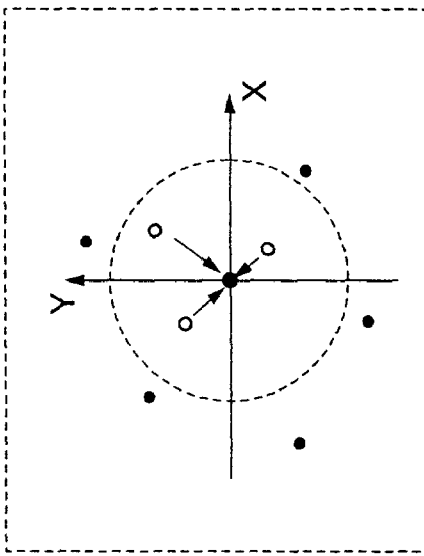
FIGS. 12A through 12D respectively are diagrams for explaining a transmitting signal and a selection output signal.
Figure 12B:
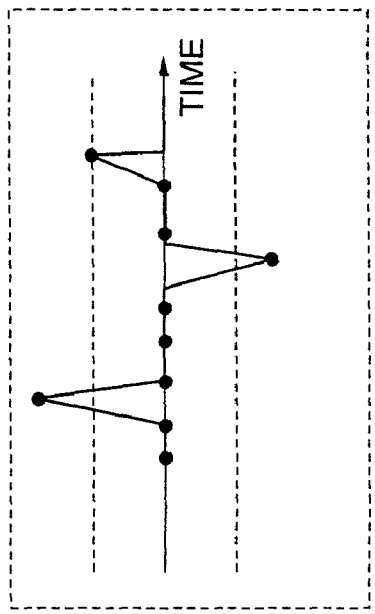
Figure 12C:
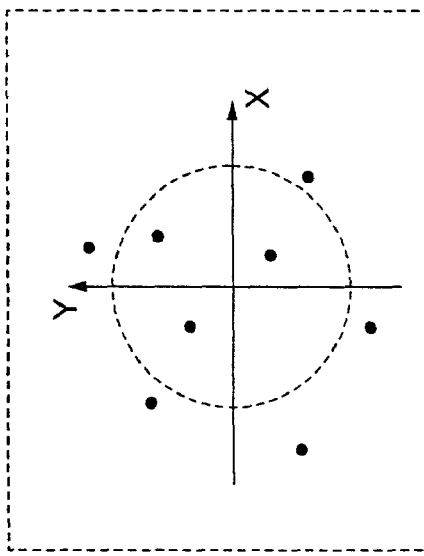
Figure 12D:
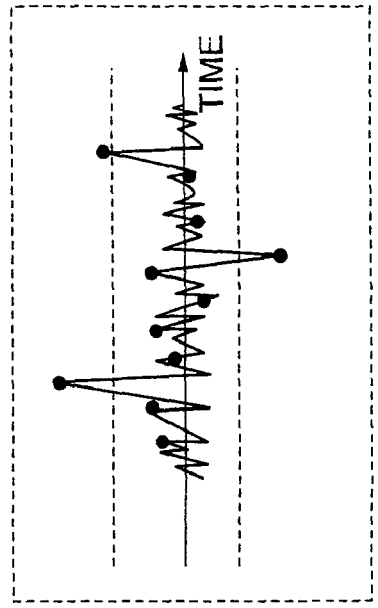

FIGS. 12A through 12D respectively are diagrams for explaining the transmitting signal C and the selection output signal D, that is, the signal point positions of the transmitting signal C on the coordinate, and the signal levels of the transmitting signal C and the selection output signal D on the time base. FIG. 12A shows the signal points of the transmitting signal C on the coordinates, where a circle indicated by a dotted line indicates the threshold value Ref. FIG. 12B shows the signal level of some signal points of the transmitting signal C on the time base, where a straight line indicated by a dotted line corresponds to the threshold value Ref of FIG. 12A. FIG. 12C shows that the signal points within the range of the threshold value Ref are transformed to the origin as the zero point signal (0+j0), and the signal points exceeding the threshold value Ref is regarded as the selection output signal D. Hence, the selection output signal D on the time base becomes as shown in FIG. 12D, and only the peak value of the transmitting signal C becomes the selection output signal D.

In this case, the sign of the signal J becomes negative when the transmitting signal power H exceeds the threshold value Ref, and the signal selector 31 selectively outputs the transmitting signal C. When the sign of the signal J becomes positive, the signal selector 31 selectively outputs the zero point signal. Accordingly, it is possible to obtain the peak value prediction signal G which is based on the peak value of the transmitting signal C.

FIG. 13 is a diagram for explaining the band-limiting filter 33 shown in FIG. 10. In the case shown in FIG. 10, the band-limiting filter 33 is formed by a transversal filter. The band-limiting filter 33 shown in FIG. 10 includes delay elements (T/n) 51, multipliers 52, and an adder 53. In FIG. 10, c1, c2, . . . , cm denote coefficients input to the multipliers 52, T denotes the sampling interval, E denotes the output signal of the frequency shifter 32 shown in FIG. 10, and F denotes the signal input to the frequency reverse shifter 34 shown in FIG. 10. By appropriately selecting the coefficients c1, c2, . . . , cm, the signal F output from the adder 53 becomes limited to the frequency band that can be eliminated in the noise eliminating section 17 of the receiving end. In this case, it is possible to obtain a desired band characteristic by the appropriate selection of the coefficients c1, c2, . . . , cm, and it is known that a desired characteristic can be obtained by using at least a predetermined number of delay elements 51 and multipliers 52.

Figure 14:
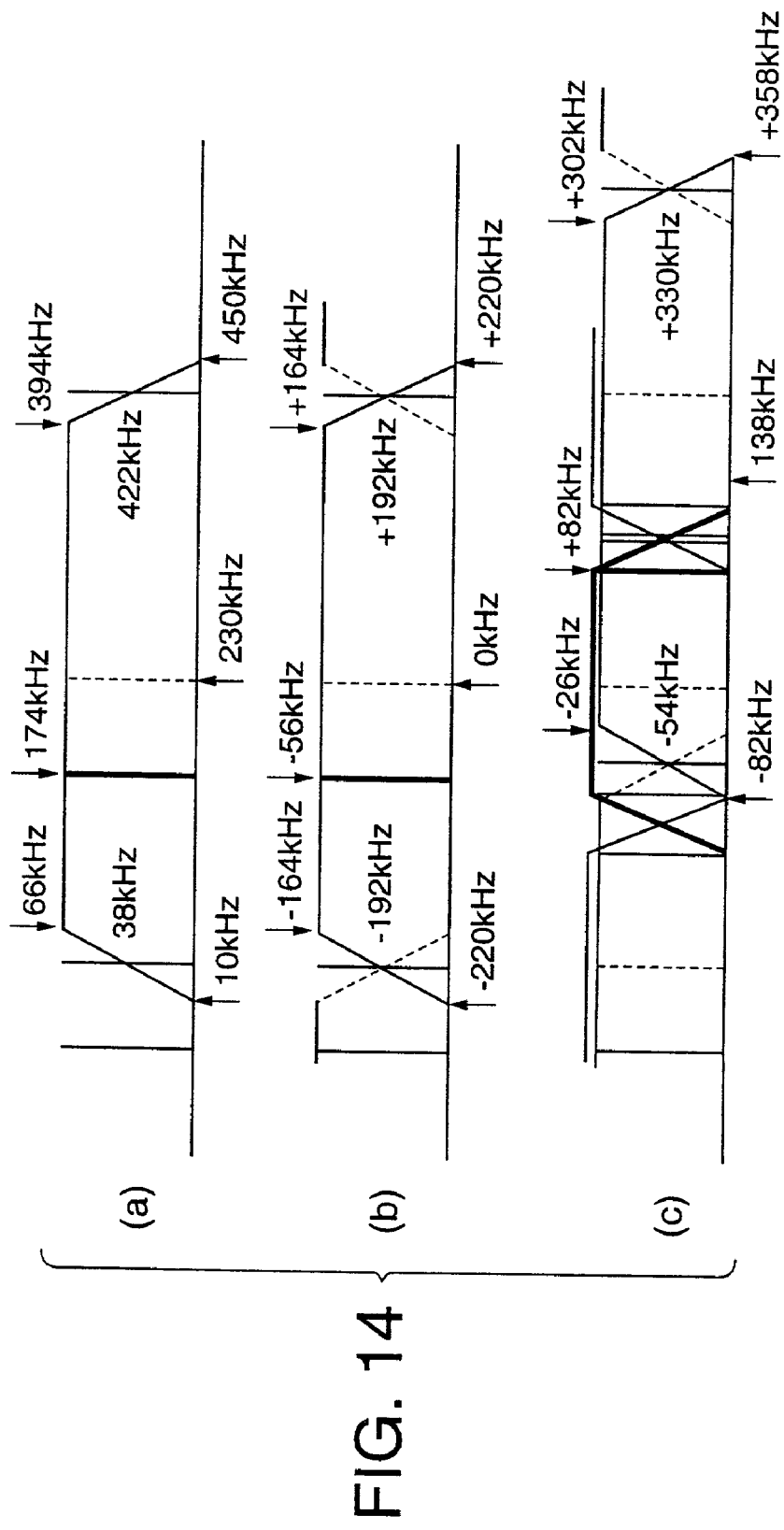
FIG. 14 is a diagram for explaining a frequency shift.
Figure 15:
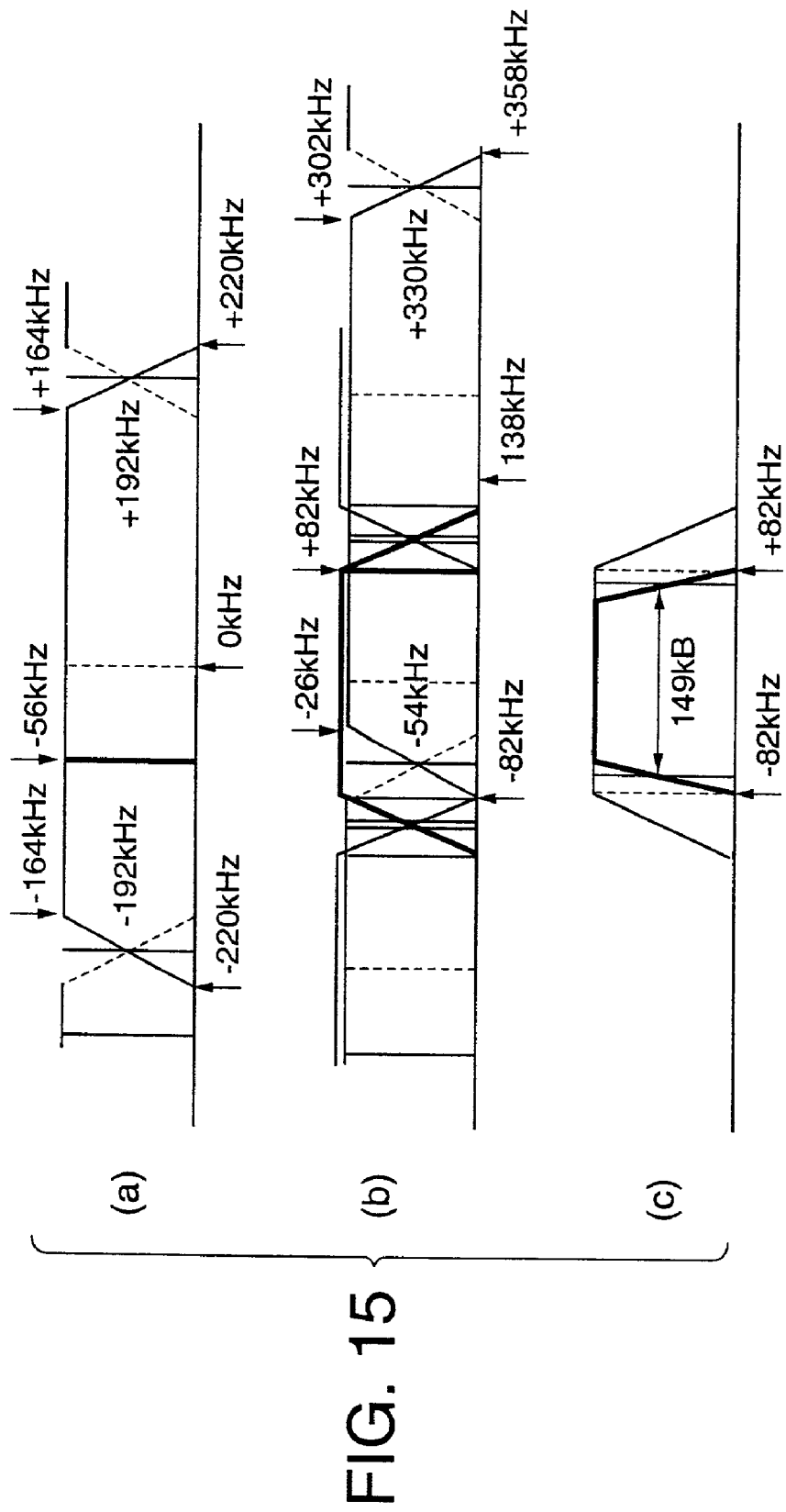
FIG. 15 is a diagram for explaining the frequency shift.

FIGS. 14 and 15 respectively are diagrams for explaining a frequency shift. In FIG. 14, (a) shows a transmission frequency band characteristic of 10 kHz to 450 kHz, and a noise cancelling frequency range at the receiving end is assumed to be 10 kHz to 174 kHz, for example. The noise cancelling frequency range is set as described above because in the special carrier systems of the power lines or the like, 165.24 kHz (≦174 kHz) is prescribed for the AM system and 162 kHz (≦174 kHz) is prescribed for the PM system. However, it is of course possible to set other frequency bands for the noise cancelling frequency range depending on the characteristic of the data transmission line.

In FIG. 14, (b) shows the signal inserted with the zero points in the zero point inserting section 4. When 0 kHz is regarded as the center, this signal has a band of −192 kHz to +192 kHz, and the noise cancelling frequency range at the receiving end becomes −220 kHz to −56 kHz. In FIG. 14, (c) shows the signal which is obtained by carrying out a frequency shift of +138 kHz with respect to the signal shown in (b). In other words, the noise cancelling frequency range of 10 kHz to 174 kHz becomes −220 kHz to −56 kHz by the zero point insertion by taking 0 kHz as the center, and is further frequency-shifted to −82 kHz to +82 kHz.

FIG. 15(a) corresponds to FIG. 14(a), and FIG. 15(b) corresponds to FIG. 14(c) after the frequency shift of +138 kHz. As shown in FIG. 15(c), the band-limiting filter 33 shown in FIG. 10 limits the band in the range of −82 kHz to +82 kHz, so that a flat characteristic obtained in the noise cancelling frequency range at the receiving end. For example, it is possible to obtain a roll-off rate of 10% in a $\cos^2$ roll-off characteristic.

Accordingly, the peak value of the transmitting signal having the transmitting signal power exceeding the threshold value Ref is frequency-shifted by the frequency shifter 32 shown in FIG. 10, and is further band-limited to the noise cancelling frequency band of the receiving end by the band-limiting filter 33. The frequency reverse shifter 34 carries out a reverse frequency shift to return the band-limited signal to the frequency band in which the signal is multiplexed to the transmitting signal A, and supplies the peak value prediction signal G to the subtracter 40. The subtracter 40 subtracts the peak value prediction signal G from the transmitting signal A, to carry out the peak suppression. The peak value prediction signal G falls within the noise cancelling frequency band of the receiving end. For this reason, the noise cancelling section 17 shown in FIGS. 6 and 9 on the receiving end can eliminate the peak value prediction signal G, so as to restore the transmitting signal including the peak value.

Figure 16:
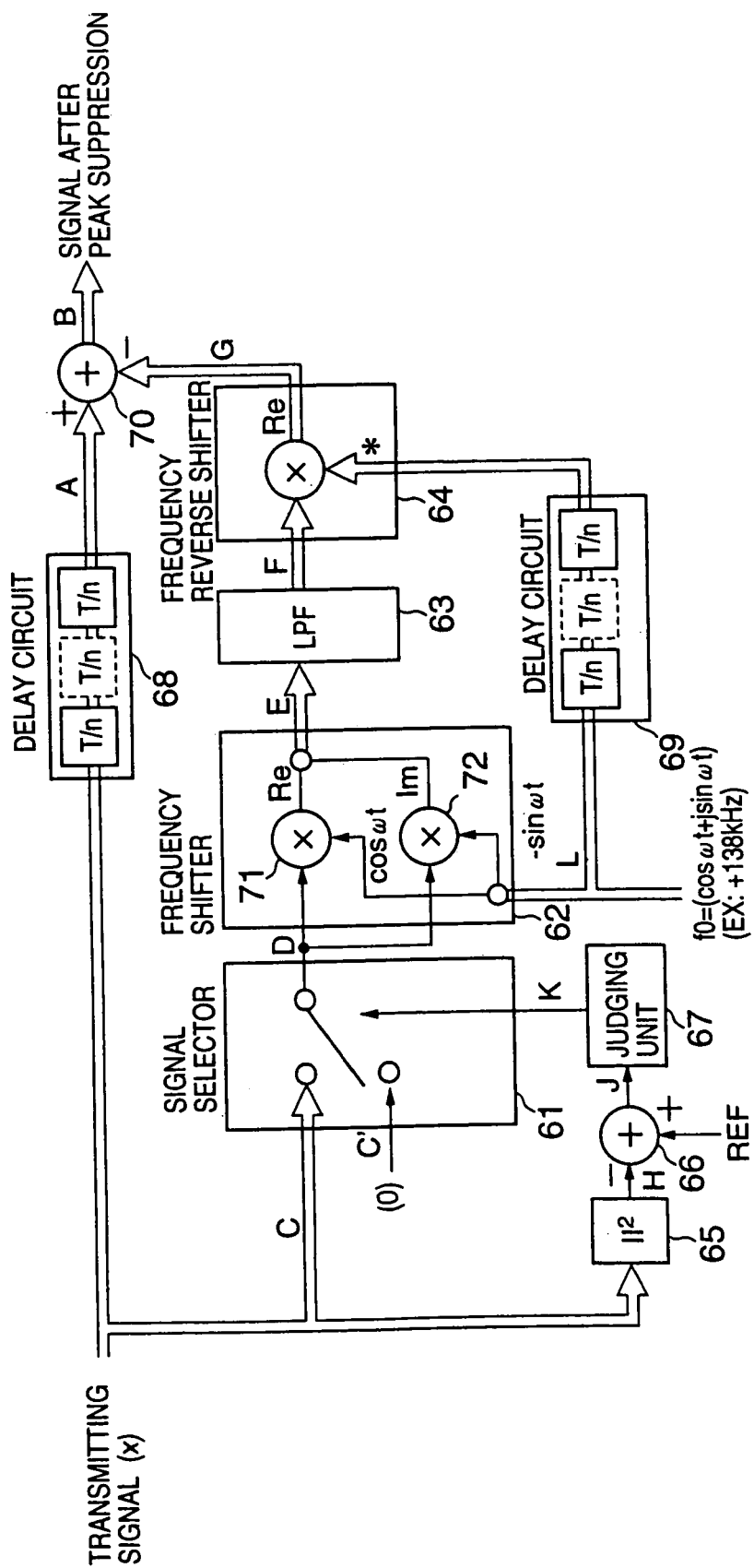
FIG. 16 is a diagram for explaining another embodiment of the peak suppressing section.

FIG. 16 is a diagram for explaining another embodiment of the peak suppressing section which may be used as any of the peak suppressing sections 21 through 23. The peak suppressing section shown in FIG. 16 includes a signal selector 61, a frequency shifter 62, a band-limiting filter (lowpass filter) 63, a frequency reverse shifter 64, a power calculating unit 65, a subtracter 66, a judging unit 67, delay circuits 68 and 69 respectively made up of a plurality of delay elements (T/n), and a subtracter 70. Multipliers 71 and 72 are provided in the frequency shifter 62. In FIG. 16, A, B, C, C', D through H and J through L denote signals at various parts of the peak suppressing section.

The structure including the signal selector 61, the power calculating unit 65, the subtracter 66 and the judging unit 67 to detect the peak value of the transmitting signal C exceeding the threshold value Ref and to selectively output the transmitting signal of the detected peak value, is the same as that of the corresponding structure of the peak suppressing section shown in FIG. 10, and a description thereof will be omitted. In addition, the functions of the delay circuits 68 and 69, the band-limiting filter 63 and the subtracter 70 are the same as those of the corresponding parts of the peak suppressing section shown in FIG. 10, and a description thereof will be omitted.

In this embodiment shown in FIG. 16, the frequency shifter 62 is formed by the multipliers 71 and 72. The multiplier 71 multiplies cos ωt of the rotation vector signal L (+f0=cos ωt+j sin ωt) to the selection output signal D form the signal selector 61, so as to obtain a real number portion Re. On the other hand, the multiplier 72 multiplies sin ωt of the rotation vector signal L to the selection output signal D, so as to obtain an imaginary number portion Im. The band-limiting filter 63 limits the band of the signal E which is made up of the real number portion Re and the imaginary number portion Im, to output the signal F. The frequency reverse shifter 64 carries out a reverse frequency shift with respect to the signal F by the rotation vector signal L (complex conjugate of F0), so as to output only the real number portion Re as the peak value prediction signal G. The peak value prediction signal G is supplied to the subtracter 70 and subtracted from the delayed transmitting signal A which is output from the delay circuit 68, to carry out the peak suppression and to output the signal B after the peak suppression.

Figure 17A:
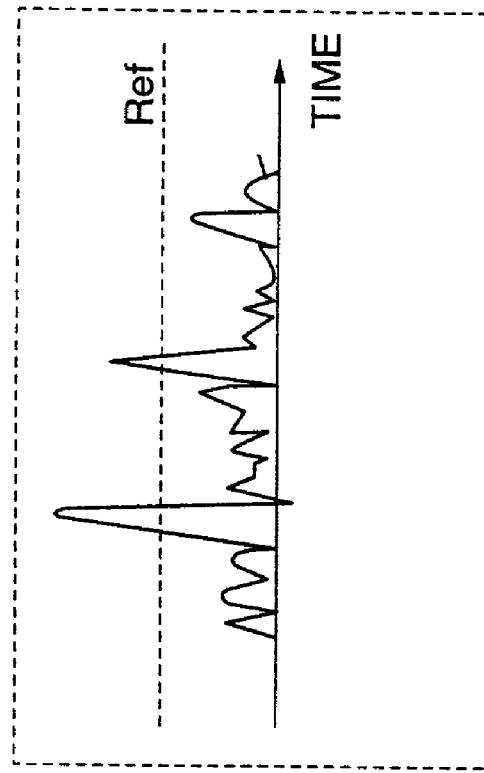
FIGS. 17A and 17B respectively are diagrams for explaining signal waveforms at various parts of the noise eliminating section.
Figure 17B:
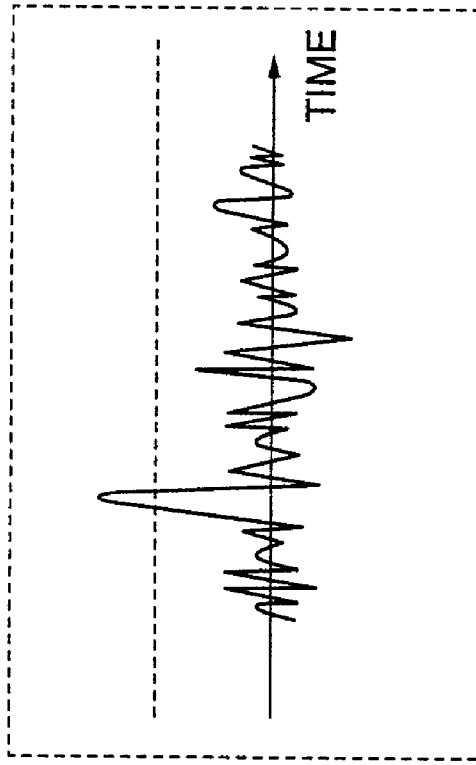

In this case, when the transmitting signal C on the time base is as shown in FIG. 17A, the transmitting signal power H output from the power calculating unit 65 becomes as shown in FIG. 17B. By obtaining in the subtracter 66 a difference between the transmitting signal power H and the threshold value Ref indicated by a dotted line in FIG. 17B, it can be judged that the signal J is the peak value of the transmitting signal C when the sign of the signal J is negative because this negative sign indicates that the transmitting signal power is large. Hence, in this case, the transmitting signal C is selectively output from the signal selector 61 as the selection output signal D. Otherwise, the signal selector 61 selectively outputs the zero point signal C' as the selection output signal D. Instead of using the power calculating unit 65, it is possible to calculate the amplitude of the transmitting signal C by obtaining the absolute value thereof, and use a corresponding threshold value to detect the peak value.

Then, the selection output signal D is frequency-shifted by the frequency shifter 62 as the real number portion Re and the imaginary number portion Im, and is further band-limited by the band-limiting filter 63 to the noise cancelling frequency band of the receiving end. The band-limited signal is reverse frequency-shifted by the frequency reverse shifter 64, and the real number portion Re is regarded as the peak value prediction signal G. The peak value prediction signal G is subtracted from the delayed transmitting signal A in the subtracter 70, so as to suppress the peak of the delayed transmitting signal. This subtracter 70 outputs the signal B which has been subjected to the peak suppression.

Figure 18A:
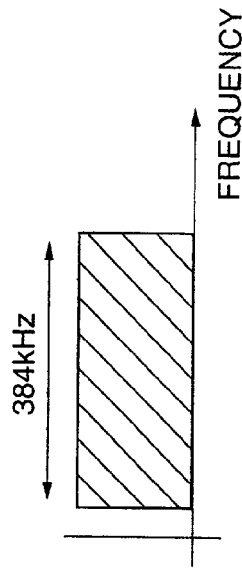
FIGS. 18A and 18B respectively are diagrams for explaining a peak suppression.
Figure 18B:
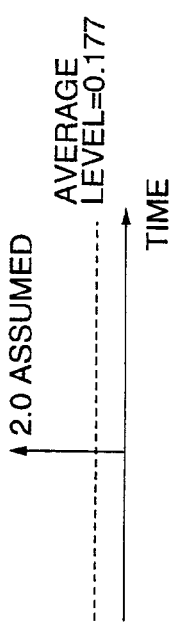
Figure 19A:
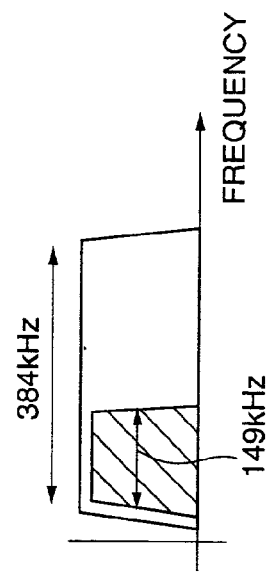
FIGS. 19A and 19B respectively are diagrams for explaining the peak suppression.
Figure 19B:
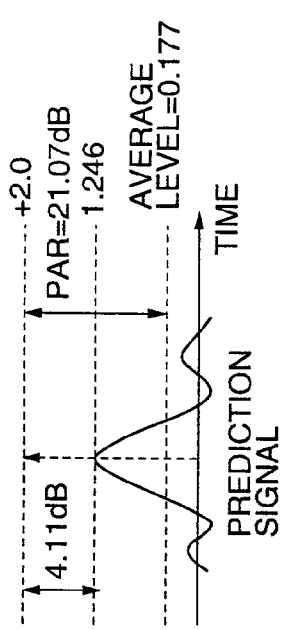

FIGS. 18A and 18B, FIGS. 19A and 19B, and FIG. 20 respectively are diagrams for explaining the peak suppression. In the multi-carrier transmission system such as the OFDM and the DMT, if the number of channels is denoted by n and a peak to average ratio is denoted by PAR as described above, the peak to average ratio PAR can be described by PAR=3.01+10 log n [dB]. For example, when making the transmission by multiplexing 64 channels, n=64 and PAR=+21.07 [dB]. FIG. 18A shows a case where the average level is 0.177 and the peak value is +2, and FIG. 18B shows the frequency band of 384 kHz for this case. In this state, if the frequency band of the peak value prediction signal shown in FIG. 19A is 149 kHz and falls within the flat characteristic portion of the noise cancelling frequency band of the receiving end as shown in FIG. 19B, the peak level of the peak value prediction signal becomes +1.246 because 10 log(149/384)=−4.11 [dB].

Figure 20:
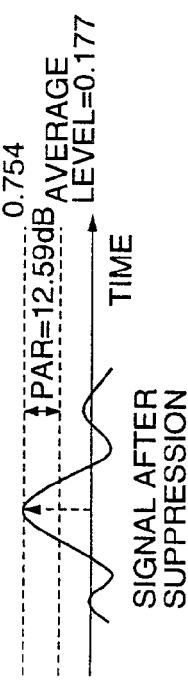
FIG. 20 is a diagram for explaining the peak suppression.

When the peak suppression is carried out using this peak value prediction signal, a signal after the peak suppression becomes as shown in FIG. 20, having a level of 2−1.246=0.754 and a PAR of PAR=20 log(0.754/0.177) =12.59 [dB]. Hence, the PAR is improved by 21.07−12.59=8.48 [dB] by this peak suppression.

Figure 21:
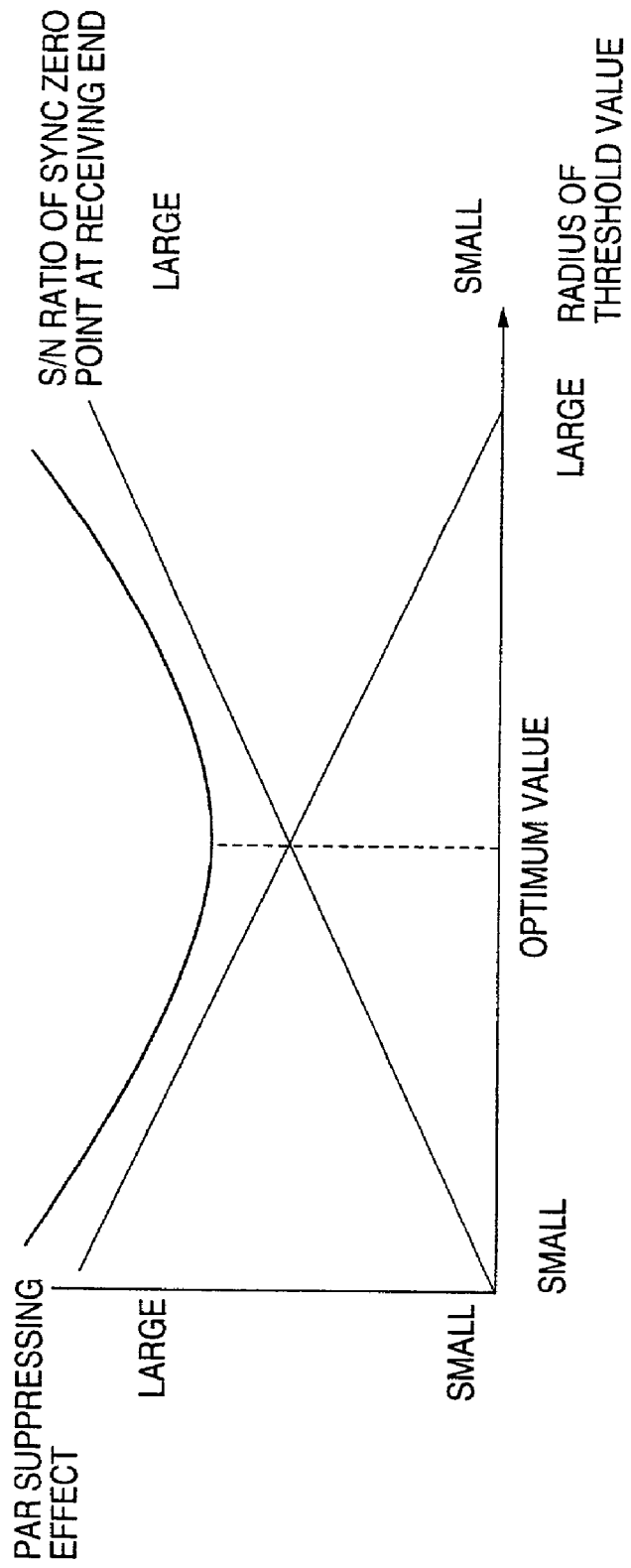
FIG. 21 is a diagram for explaining a threshold value selection.

When selecting the threshold value Ref used in FIGS. 10 and 16, the smaller the radius of the circle in FIGS. 12A and 12C indicating the threshold value Ref, the larger the PAR suppressing effect. On the other hand, the larger the radius of the circle indicating the threshold value Ref, the larger the S/N ratio of the synchronizing zero point at the receiving end. FIG. 21 is a diagram for explaining the threshold value selection. As shown in FIG. 21, there is an optimum value for the threshold value Ref, and the optimum value can be selected depending on the data transmitting conditions. In FIG. 21, the left ordinate indicates the PAR suppressing effect, the right ordinate indicates the S/N ratio of the synchronizing zero point at the receiving end, and the abscissa indicates the radius of the circle indicating the threshold value Ref.

Further, the present invention is not limited to theses embodiments, but various variations and modifications may be made without departing from the scope of the present invention. The data transmission line is not limited to the low-voltage distribution line, and the present invention is similarly applicable to other cable transmission lines such as ADSL, SDSL and VDSL, wireless transmission lines such as OFDM broadcasting and wireless LAN, and optical transmission lines such as WDM multiplexing. Moreover, various other multi-carrier modulation systems may be employed in addition to the system described above.

What is claimed is:

1. A peak suppression method comprising the steps of:
   (a) detecting a peak value exceeding a threshold value of a transmitting signal;
   (b) forming a peak value prediction signal having a frequency component which is limited to a noise cancelling frequency band of a receiving end, based on the detected peak value of the transmitting signal; and
   (c) subtracting the peak value prediction signal from the transmitting signal.

2. The peak suppression method as claimed in claim 1, wherein:
   said step (a) detects the peak value of the transmitting signal which is inserted with a zero point signal at predetermined intervals with respect to signal points;
   said step (c) transmits to the receiving end a subtracted result as a peak suppressed signal;
   and further comprising the steps of:
   (d) extracting a noise component multiplexed to the zero point signal at the receiving end;
   (e) obtaining a noise component multiplexed to the signal point by an interpolation process; and
   (f) cancelling the noise component multiplexed to the signal point using the noise component obtained by said step (e).

3. The peak suppression method as claimed in claim 1, wherein:
   said step (a) detects the peak value of the transmitting signal which is inserted with a zero point signal at predetermined intervals with respect to signal points and shaped by a roll-off filter; and
   further comprising the step of:
   (d) modulating the peak suppressed signal before transmission to the receiving end.

4. The peak suppression method as claimed in claim 1, wherein said step (a) detects the peak value of the transmitting signal which is inserted with a zero point signal at predetermined intervals with respect to signal points, shaped by a roll-off filter and digitally modulated.

5. The peak suppression method as claimed in claim 1, wherein said step (a) includes:
   forming the transmitting signal by inserting a zero point signal at predetermined intervals with respect to signal points;
   comparing a power of the transmitting signal and a threshold value; and
   detecting the peak value when the power of the transmitting signal exceeds the threshold value,
   and further comprising the steps of:
   (d) decimating a position corresponding to the signal point of the peak suppressed signal received by the receiving end to extract a noise component at a zero point signal position;
   (e) obtaining a noise component at the signal point position based on the noise component of the zero point signal position; and
   (f) cancelling the noise component multiplexed in the received peak suppressed signal based on the noise component at the signal point position.

6. A peak suppression method comprising the steps of:
   (a) calculating a power of a transmitting signal;
   (b) comparing the power of the transmitting signal and a threshold value, and selectively outputting, as a selection output signal, a peak value of the transmitting signal by judging the peak value of the transmitting signal when the power of the transmitting signal exceeds the threshold value, and a zero point signal having a zero level when the power of the transmitting signal does not exceed the threshold value;
   (c) frequency-shifting the selection output signal, band-limiting the frequency shifted signal to a noise cancelling frequency band of a receiving end, and reverse frequency-shifting the band-limited signal to a frequency band of the transmitting signal, so as to form a peak value prediction signal; and
   (d) subtracting the peak value prediction signal from the transmitting signal.

7. The peak suppression method as claimed in claim 6, wherein:
   said step (b) detects the peak value of the transmitting signal which is inserted with a zero point signal at predetermined intervals with respect to signal points;
   said step (d) transmits to the receiving end a subtracted result as a peak suppressed signal; and further comprising the steps of:
   (e) extracting a noise component multiplexed to the zero point signal at the receiving end;
   (f) obtaining a noise component multiplexed to the signal point by an interpolation process; and
   (g) cancelling the noise component multiplexed to the signal point using the noise component obtained by said step (f).

8. The peak suppression method as claimed in claim 6, wherein:
   said step (b) detects the peak value of the transmitting signal which is inserted with a zero point signal at predetermined intervals with respect to signal points and shaped by a roll-off filter; and
   further comprising the step of:
   (e) modulating the peak suppressed signal before transmission to the receiving end.

9. The peak suppression method as claimed in claim 6, wherein said step (b) detects the peak value of the transmitting signal which is inserted with a zero point signal at predetermined intervals with respect to signal points, shaped by a roll-off filter and digitally modulated.

10. The peak suppression method as claimed in claim 6, wherein said step (a) includes forming the transmitting signal by inserting a zero point signal at predetermined intervals with respect to signal points,
    and further comprising the steps of:
    (e) decimating a position corresponding to the signal point of the peak suppressed signal received by the receiving end to extract a noise component at a zero point signal position;
    (f) obtaining a noise component at the signal point position based on the noise component of the zero point signal position; and
    (g) cancelling the noise component multiplexed in the received peak suppressed signal based on the noise component at the signal point position.

11. A peak suppression method comprising the steps of:
    (a) calculating a power or an amplitude of a transmitting signal;
    (b) comparing the power or amplitude of the transmitting signal and a threshold value, and selectively outputting, as a selection output signal, a peak value of the transmitting signal by judging the peak value of the transmitting signal when the power or amplitude of the transmitting signal exceeds the threshold value, and a zero point signal having a zero level when the power or amplitude of the transmitting signal does not exceed the threshold value;
    (c) frequency-shifting the selection output signal by a rotation vector signal by separating the selection output signal into a real number portion and an imaginary number portion, band-limiting the frequency shifted signal to a noise cancelling frequency band of a receiving end, and reverse frequency-shifting the band-limited signal by the rotation vector signal to a frequency band of the transmitting signal, so as to form a peak value prediction signal by a real number portion of the reverse frequency-shifted signal; and
    (d) subtracting the peak value prediction signal from the transmitting signal.

12. The peak suppression method as claimed in claim 11, wherein:
    said step (b) detects the peak value of the transmitting signal which is inserted with a zero point signal at predetermined intervals with respect to signal points;
    said step (d) transmits to the receiving end a subtracted result as a peak suppressed signal;
    and further comprising the steps of:
    (e) extracting a noise component multiplexed to the zero point signal at the receiving end;
    (f) obtaining a noise component multiplexed to the signal point by an interpolation process; and
    (g) cancelling the noise component multiplexed to the signal point using the noise component obtained by said step (f).

13. The peak suppression method as claimed in claim 11, wherein:
    said step (b) detects the peak value of the transmitting signal which is inserted with a zero point signal at predetermined intervals with respect to signal points and shaped by a roll-off filter; and
    further comprising the step of:.
    (e) modulating the peak suppressed signal before transmission to the receiving end.

14. The peak suppression method as claimed in claim 11, wherein said step (b) detects the peak value of the transmitting signal which is inserted with a zero point signal at predetermined intervals with respect to signal points, shaped by a roll-off filter and digitally modulated.

15. The peak suppression method as claimed in claim 11, wherein said step (a) includes forming the transmitting signal by inserting a zero point signal at predetermined intervals with respect to signal points,
and further comprising the steps of:
(e) decimating a position corresponding to the signal point of the peak suppressed signal received by the receiving end to extract a noise component at a zero point signal position;
(f) obtaining a noise component at the signal point position based on the noise component of the zero point signal position; and
(g) cancelling the noise component multiplexed in the received peak suppressed signal based on the noise component at the signal point position.

16. A data transmission apparatus adapted to a multicarrier transmission, comprising:
a detector detecting a peak value of a transmitting signal exceeding a threshold value;
a signal forming section forming a peak value prediction signal having a frequency component which is band-limited to a noise cancelling frequency band of a receiving end, based on the peak value of the transmitting signal; and
a subtracter subtracting the peak value prediction signal from the peak value of the transmitting signal.

17. The data transmission apparatus as claimed in claim 16, wherein:
said detector includes a calculating unit calculating a power or an amplitude of the transmitting signal;
and said signal forming section includes:
a signal selector comparing the power or amplitude of the transmitting signal and the threshold value, and selectively outputting, as a selection output signal, the transmitting signal when the power or amplitude of the transmitting signal exceeds the threshold value, and a zero point signal having a zero level when the power or amplitude of the transmitting signal does not exceed the threshold value;
a frequency shifter frequency-shifting the selection output signal by a rotation vector signal;
a filter band-limiting the frequency shifted signal to a noise cancelling frequency band of the receiving end; and
a frequency reverse shifter reverse frequency-shifting the band-limited signal to a frequency band of the transmitting signal, so as to form the peak value prediction signal.

18. The data transmission apparatus as claimed in claim 16, wherein:
said detector includes a calculating unit calculating a power or an amplitude of the transmitting signal;
and said signal forming section includes:
a signal selector comparing the power or amplitude of the transmitting signal and a threshold value, and selectively outputting, as a selection output signal, the transmitting signal when the power or amplitude of the transmitting signal exceeds the threshold value, and a zero point signal having a zero level when the power or amplitude of the transmitting signal does not exceed the threshold value;
a frequency shifter frequency-shifting the selection output signal by a rotation vector signal by separating the selection output signal into a real number portion and an imaginary number portion;
a filter band-limiting the frequency shifted signal to a noise cancelling frequency band of the receiving end; and
a frequency reverse shifter reverse frequency-shifting the band-limited signal by the rotation vector signal to a frequency band of the transmitting signal, so as to form the peak value prediction signal by a real number portion of the reverse frequency-shifted signal.

19. A data transmission apparatus adapted to a multicarrier transmission, comprising:
a zero point inserting section inserting a zero point signal at predetermined intervals with respect to signal points to output a transmitting signal; and
a peak suppressing section, coupled at a stage subsequent to said zero point inserting section, detecting a peak value of the transmitting signal exceeding a threshold value and forming a peak value prediction signal having a frequency component which is band-limited to a noise cancelling frequency band of a receiving end based on the detected peak value of the transmitting signal, and carrying out a peak suppression by subtracting the peak value prediction signal from the peak value of the transmitting signal.

20. The data transmission apparatus as claimed in claim 19, wherein said peak suppressing section comprises:
a calculating unit calculating a power or an amplitude of the transmitting signal;
a signal selector comparing the power or amplitude of the transmitting signal and the threshold value, and selectively outputting, as a selection output signal, the transmitting signal when the power or amplitude of the transmitting signal exceeds the threshold value, and the zero point signal having a zero level when the power or amplitude of the transmitting signal does not exceed the threshold value;
a frequency shifter frequency-shifting the selection output signal by a rotation vector signal;
a filter band-limiting the frequency shifted signal to the noise cancelling frequency band of the receiving end; and
a frequency reverse shifter reverse frequency-shifting the band-limited signal to a frequency band of the transmitting signal, so as to form the peak value prediction signal.

21. The data transmission apparatus as claimed in claim 19, wherein said peak suppressing section comprises:
a calculating unit calculating a power or an amplitude of the transmitting signal;
a signal selector comparing the power or amplitude of the transmitting signal and a threshold value, and selectively outputting, as a selection output signal, the transmitting signal when the power or amplitude of the transmitting signal exceeds the threshold value, and the zero point signal having a zero level when the power or amplitude of the transmitting signal does not exceed the threshold value;
a frequency shifter frequency-shifting the selection output signal by a rotation vector signal by separating the selection output signal into a real number portion and an imaginary number portion;
a filter band-limiting the frequency shifted signal to the noise cancelling frequency band of the receiving end; and a frequency reverse shifter reverse frequency-shifting the band-limited signal by the rotation vector signal to a frequency band of the transmitting signal, so as to form the peak value prediction signal by a real number portion of the reverse frequency-shifted signal.

22. A data transmission apparatus adapted to a multi-carrier transmission, comprising:
a zero point inserting section inserting a zero point signal at predetermined intervals with respect to signal points to output a transmitting signal;
a roll-off filter, coupled at a stage subsequent to said zero point inserting section, shaping the transmitting signal; and
a peak suppressing section detecting a peak value of the transmitting signal output from said roll-off filter and exceeding a threshold value and forming a peak value prediction signal which is band-limited to a noise cancelling frequency band of a receiving end based on the detected peak value of the transmitting signal, and carrying out a peak suppression by subtracting the peak value prediction signal from the peak value of the transmitting signal.

23. The data transmission apparatus as claimed in claim 22, wherein said peak suppressing section comprises:
a calculating unit calculating a power or an amplitude of the transmitting signal;
a signal selector comparing the power or amplitude of the transmitting signal and the threshold value, and selectively outputting, as a selection output signal, the transmitting signal when the power or amplitude of the transmitting signal exceeds the threshold value, and the zero point signal having a zero level when the power or amplitude of the transmitting signal does not exceed the threshold value;
a frequency shifter frequency-shifting the selection output signal by a rotation vector signal;
a filter band-limiting the frequency shifted signal to the noise cancelling frequency band of the receiving end; and
a frequency reverse shifter reverse frequency-shifting the band-limited signal to a frequency band of the transmitting signal, so as to form the peak value prediction signal.

24. The data transmission apparatus as claimed in claim 22, wherein said peak suppressing section comprises:
a calculating unit calculating a power or an amplitude of the transmitting signal;
a signal selector comparing the power or amplitude of the transmitting signal and a threshold value, and selectively outputting, as a selection output signal, the transmitting signal when the power or amplitude of the transmitting signal exceeds the threshold value, and the zero point signal having a zero level when the power or amplitude of the transmitting signal does not exceed the threshold value;
a frequency shifter frequency-shifting the selection output signal by a rotation vector signal by separating the selection output signal into a real number portion and an imaginary number portion;
a filter band-limiting the frequency shifted signal to the noise cancelling frequency band of the receiving end; and
a frequency reverse shifter reverse frequency-shifting the band-limited signal by the rotation vector signal to a frequency band of the transmitting signal, so as to form the peak value prediction signal by a real number portion of the reverse frequency-shifted signal.

25. A data transmission apparatus adapted to a multi-carrier transmission, comprising:
a zero point inserting section inserting a zero point signal at predetermined intervals with respect to signal points to output a transmitting signal;
a roll-off filter, coupled at a stage subsequent to said zero point inserting section, shaping the transmitting signal;
a modulator digitally modulating the shaped transmitting signal output from said roll-off filter; and
a peak suppressing section detecting a peak value of the modulated transmitting signal output from said modulator and exceeding a threshold value and forming a peak value prediction signal which is band-limited to a noise cancelling frequency band of a receiving end based on the detected peak value of the modulated transmitting signal, and carrying out a peak suppression by subtracting the peak value prediction signal from the peak value of the modulated transmitting signal.

26. The data transmission apparatus as claimed in claim 25, wherein said peak suppressing section comprises:
a calculating unit calculating a power or an amplitude of the transmitting signal;
a signal selector comparing the power or amplitude of the transmitting signal and the threshold value, and selectively outputting, as a selection output signal, the transmitting signal when the power or amplitude of the transmitting signal exceeds the threshold value, and the zero point signal having a zero level when the power or amplitude of the transmitting signal does not exceed the threshold value;
a frequency shifter frequency-shifting the selection output signal by a rotation vector signal;
a filter band-limiting the frequency shifted signal to the noise cancelling frequency band of the receiving end; and
a frequency reverse shifter reverse frequency-shifting the band-limited signal to a frequency band of the transmitting signal, so as to form the peak value prediction signal.

27. The data transmission apparatus as claimed in claim 25, wherein said peak suppressing section comprises:
a calculating unit calculating a power or an amplitude of the transmitting signal;
a signal selector comparing the power or amplitude of the transmitting signal and a threshold value, and selectively outputting, as a selection output signal, the transmitting signal when the power or amplitude of the transmitting signal exceeds the threshold value, and the zero point signal having a zero level when the power or amplitude of the transmitting signal does not exceed the threshold value;
a frequency shifter frequency-shifting the selection output signal by a rotation vector signal by separating the selection output signal into a real number portion and an imaginary number portion;
a filter band-limiting the frequency shifted signal to the noise cancelling frequency band of the receiving end; and
a frequency reverse shifter reverse frequency-shifting the band-limited signal by the rotation vector signal to a frequency band of the transmitting signal, so as to form the peak value prediction signal by a real number portion of the reverse frequency-shifted signal.

28. A data transmission apparatus adapted to a multi-carrier transmission, comprising:
a transmitting section; and
a receiving section, said transmitting section comprising:

a zero point inserting section inserting a zero point signal at predetermined intervals with respect to signal points to output a transmitting signal; and a peak suppressing section, coupled at a stage subsequent to said zero point inserting section, detecting a peak value of the transmitting signal exceeding a threshold value and forming a peak value prediction signal which is band-limited to a noise cancelling frequency band of said receiving section based on the detected peak value of the transmitting signal, and carrying out a peak suppression by subtracting the peak value prediction signal from the peak value of the transmitting signal;

said receiving section comprising:

a decimator decimating a position corresponding to the signal point of a received signal to extract a noise component of a zero point signal position;

an interpolator interpolating a noise component of a signal point position by the noise component of the zero point signal position; and a noise eliminating section cancelling a noise multiplexed to the received signal by the noise component of the signal point position.

\* \* \* \* \*